US012428774B2

(12) United States Patent
Kim et al.

(10) Patent No.: US 12,428,774 B2
(45) Date of Patent: Sep. 30, 2025

(54) LINT REMOVING APPARATUS AND CLOTHES DRYER HAVING THE SAME

(71) Applicant: Samsung Electronics Co., Ltd., Suwon-si (KR)

(72) Inventors: Juyeong Kim, Suwon-si (KR); Daesung Ki, Suwon-si (KR); Hyunuk Park, Suwon-si (KR); Dongpil Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 18/427,611

(22) Filed: Jan. 30, 2024

(65) Prior Publication Data

US 2024/0191423 A1 Jun. 13, 2024

Related U.S. Application Data

(63) Continuation of application No. 17/119,763, filed on Dec. 11, 2020, now Pat. No. 11,932,983.

(30) Foreign Application Priority Data

Dec. 13, 2019 (KR) ........................ 10-2019-0166523

(51) Int. Cl.
*D06F 58/22* (2006.01)
*D06F 58/04* (2006.01)
(Continued)

(52) U.S. Cl.
CPC .............. *D06F 58/22* (2013.01); *D06F 58/04* (2013.01); *F26B 13/108* (2013.01); *F26B 13/14* (2013.01)

(58) Field of Classification Search
CPC .......... D06F 58/22; D06F 58/04; D06F 58/10; F26B 13/108; F26B 13/14; B01D 46/681
See application file for complete search history.

(56) References Cited

U.S. PATENT DOCUMENTS 6,193,053 B1 2/2001 Gaalswyk
9,062,410 B2 6/2015 Ahn et al.
(Continued)

FOREIGN PATENT DOCUMENTS

CN 105492677 A 4/2016
CN 105648724 A 6/2016
(Continued)

OTHER PUBLICATIONS

International Search Report and Written Opinion of the International Searching Authority in connection with International Application No. PCT/KR2020/017764 issued Apr. 9, 2021, 8 pages.
(Continued)

*Primary Examiner* — Jessica Yuen

(57) ABSTRACT

A clothes dryer including a cabinet, a drum rotatably supported in the cabinet, a supply port configured to guide air into the drum, an exhaust port configured to guide the air in the drum to an outside of the drum, and a lint removing apparatus configured to remove lint from the air passing through the exhaust port. Where the lint removing apparatus includes a lint filter configured to capture lint, a rotation member rotatably installed to scrape and collect the lint captured in the lint filer, a driving device configured to generate power, a first coupler connected to the driving device to receive the power from the driving device, and a second coupler coupled to the first coupler to transmit the power to the rotation member.

5 Claims, 27 Drawing Sheets

(51) Int. Cl.
*F26B 13/10* (2006.01)
*F26B 13/14* (2006.01)

(56) References Cited

U.S. PATENT DOCUMENTS

| | | | |
|---|---|---|---|
| 9,845,567 B2 | 12/2017 | Contarini et al. | |
| 10,077,528 B2 | 9/2018 | Yoichi et al. | |
| 11,441,257 B2 | 9/2022 | Hato et al. | |
| 11,932,983 B2 * | 3/2024 | Kim | D06F 58/22 |

FOREIGN PATENT DOCUMENTS

| | | | |
|---|---|---|---|
| JP | H06-46694 U | 6/1994 | |
| JP | 2011-130788 A | 7/2011 | |
| JP | 2014-076229 A | 5/2014 | |
| JP | 2016-101374 A | 6/2016 | |
| JP | 2016-179146 A | 10/2016 | |
| KR | 20-1991-0008857 Y1 | 11/1991 | |
| KR | 10-0826535 B1 | 5/2008 | |
| KR | 10-2010-0070017 A | 6/2010 | |
| KR | 10-1241899 B1 | 3/2013 | |
| KR | 10-2016-0064937 A | 6/2016 | |
| RU | 2450962 C1 | 5/2012 | |
| WO | 2019/103544 A1 | 5/2019 | |

OTHER PUBLICATIONS

Supplementary European Search Report dated Oct. 12, 2022 in connection with European Patent Application No. 20 89 9750.2, 8 pages.

The First Office Action dated Jul. 1, 2024, in connection with Chinese Application No. 202080085437.3, 12 pages.

Communication under Rule 71(3) EPC dated Jul. 17, 2024, in connection with European Application No. 20899750.2, 76 pages.

Notice of Preliminary Rejection issued Dec. 2, 2024, in connection with Korean Patent Application No. 10-2019-0166523, 8 pages.

* cited by examiner

140 : 141, 142, 143
150 : 151, 152, 153, 154
170 : 170a, 170b, 170c, 171, 172

140 : 141, 142, 143
150 : 151, 152, 153

140 : 141, 142, 143
150 : 151, 152, 153, 154

140 : 141, 142, 143
150 : 151, 152, 153, 154

140 : 141, 142, 143
150 : 151, 152, 153, 155

LINT REMOVING APPARATUS AND CLOTHES DRYER HAVING THE SAME

CROSS-REFERENCE TO RELATED APPLICATION

This application is a continuation of application Ser. No. 17/119,763, filed Dec. 11, 2020, which is based on and claims priority under 35 U.S.C. § 119 to Korean Patent Application No. 10-2019-0166523, filed on Dec. 13, 2019 in the Korean Intellectual Property Office, the disclosures of which are incorporated herein by reference.

BACKGROUND

1. Field

The disclosure relates to a lint removal apparatus and a clothes dryer having the same, and more specifically, coupling and separating of a lint removal apparatus.

2. Description of the Related Art

In general, a clothes dryer refers to a device that forcibly blows hot air into a drum to dry wet laundry inserted into the drum. The clothes dryers have an appearance similar to that of a drum type washing machine, and may dry laundry by forcibly circulating heated air into a drum through a heater and a blower fan.

Air discharged from the drum during operation of the clothes dryer may contain lint (fluff). Since the air discharged from the drum is circulated back into the drum through a heat exchanger, there is a need to remove lint in the air before circulation.

For this, a lint removal apparatus is required. The lint removal apparatus includes a filter separably provided and configured to collect lint, a rotation member configured to scrape lint remaining on a surface of the filter and push the scraped lint from one end portion of the filter, and a lint box disposed adjacent to the other end portion of the filter to accumulate the lint pushed to the other end portion of the filter.

The filter of the dryer is provided to be directly removed by a user, cleaned, and installed, and there is no separate filter cleaning module in the dryer. Therefore, the filter of the dryer needs to be manually removed by users for cleaning the dryer filter, and with the filter not cleaned, lint may accumulate and the drying performance may deteriorate.

SUMMARY

Therefore, it is an object of the disclosure to provide a clothes dryer for facilitating separation of a lint removal apparatus.

It is another object of the disclosure to provide a clothes dryer for facilitating cleaning of a lint filter by easily separating a lint removal apparatus.

Additional aspects of the disclosure will be set forth in part in the description which follows and, in part, will be obvious from the description, or may be learned by practice of the disclosure.

According to an aspect of the disclosure, there is provided a clothes dryer including: a cabinet; a drum rotatably supported in the cabinet; a supply port configured to guide air into the drum; an exhaust port configured to guide the air in the drum to an outside of the drum; and a lint removing apparatus configured to remove lint from the air passing through the exhaust port, wherein the lint removing apparatus includes: a lint filter configured to capture lint; a rotation member rotatably installed to scrap and collect the lint captured in the lint filer; a driving device configured to generate power; a first coupler connected to the driving device to receive the power from the driving device; and a second coupler coupled to the first coupler to transmit the power to the rotation member.

The lint removal apparatus may include a first rotation shaft to which the first coupler is coupled and an elastic member disposed on the first rotation shaft to elastically press the first coupler such that the first coupler and the second coupler are coupled to each other.

The lint removing apparatus may include a second rotation shaft to which the second coupler is coupled and an elastic member disposed on the second rotation shaft to elastically press the second coupler such that the first coupler and the second coupler are coupled to each other.

The clothes dryer may further include a front cover rotatably provided to open and close a front surface of the lint removing apparatus and a link member connected to the front cover to be rotated along the front cover, wherein when the front cover is opened, the first coupler may be separated from the second coupler through the link member.

The lint removing apparatus may further include a holder configured to be rotated at an outside of the first coupler in connection with the link member such that the first coupler and the second coupler are coupled to or separated from each other.

The lint removing apparatus may include an inclined surface formed on each of the first coupler and the second coupler such that the first coupler and the second coupler, when rotating in a reverse direction, are separated from each other by sliding.

The lint removing apparatus may further include: a holder configured to be rotated at an outside of the first coupler such that the first coupler and the second coupler are coupled to or separated from each other; and a case configured to surround the driving device and the first coupler, wherein the case may further include a first guider, and the first guider is formed in an inclined shape to separate the first coupler from the second coupler through rotation of the holder.

The lint removing apparatus may further include: a frame member formed at an outside of the rotation member; and a holder provided at an outside of the second coupler such that the first coupler and the second coupler are coupled to or separated from each other.

The frame member may include a second guider having a screw crest shape that guides a rotation direction of the holder to prevent the holder from being separated.

The lint removing apparatus may further include a lever coupled to the second coupler and configured to be pressed in a direction toward the second coupler such that the first coupler and the second coupler are separated from each other.

According to another aspect of the disclosure, there is provided a clothes dryer including: a cabinet; a drum rotatably supported in the cabinet; a supply port configured to guide air into the drum; an exhaust port configured to guide the air in the drum to an outside of the drum; and a lint removing apparatus configured to remove lint from the air passing through the exhaust port, wherein the lint removing apparatus includes: a lint filter configured to capture lint; a rotation member including a fin having a spiral shape to scrap and collect the lint captured in the lint filer; a driving device including a motor rotatable in both directions; a first coupler connected to the driving device to receive power from the driving device; and a second coupler coupled to the first coupler to transmit the power to the rotation member, wherein the motor operates such that the first coupler and the second coupler are coupled to or separated from each other.

The lint removal apparatus may include: a first rotation shaft to which the first coupler is coupled; and an elastic member disposed on the first rotation shaft to elastically press the first coupler such that the first coupler and the second coupler are coupled to each other.

The lint removing apparatus may include an inclined surface formed on each of the first coupler and the second coupler such that the first coupler and the second coupler, when rotating in a reverse direction, are separated from each other by sliding.

The lint removing apparatus may include a terminal gear integrally formed with the first coupler, and configured to transmit the power generated from the driving device by being coupled to the second coupler.

The lint removing apparatus may include: a case configured to surround the driving device and the first coupler; a first rotation shaft provided on the case and coupled to the terminal gear; a screw crest formed on the first rotation shaft; and a screw root formed on the terminal gear and configured to guide a rotation direction of the terminal gear by being coupled to the screw crest.

According to another aspect of the disclosure, there is provided a lint removing apparatus including: a lint filter configured to capture lint; a rotation member including a fin having a spiral shape to scrap and collect the lint captured in the lint filer; a driving device configured to generate power; a first coupler connected to the driving device to receive power from the driving device; and a second coupler coupled to the first coupler to transmit the power to the rotation member.

The lint removing apparatus may further include a first rotation shaft to which the first coupler is coupled and an elastic member disposed on the first rotation shaft to elastically press the first coupler such that the first coupler and the second coupler are coupled to each other.

The lint removing apparatus may further include: a holder configured to be rotated at an outside of the first coupler such that the first coupler and the second coupler are coupled to or separated from each other; and a case configured to surround the driving device and the first coupler, wherein the case may include a first guider, and the first guider is formed in an inclined shape to separate the first coupler from the second coupler through rotation of the holder.

The lint removing apparatus may further include an inclined surface formed on each of the first coupler and the second coupler such that the first coupler and the second coupler, when rotating in a reverse direction, are separated from each other by sliding.

The lint removing apparatus may further include a lever coupled to the second coupler and configured to be pressed in a direction toward the second coupler such that the first coupler and the second coupler are separated from each other.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
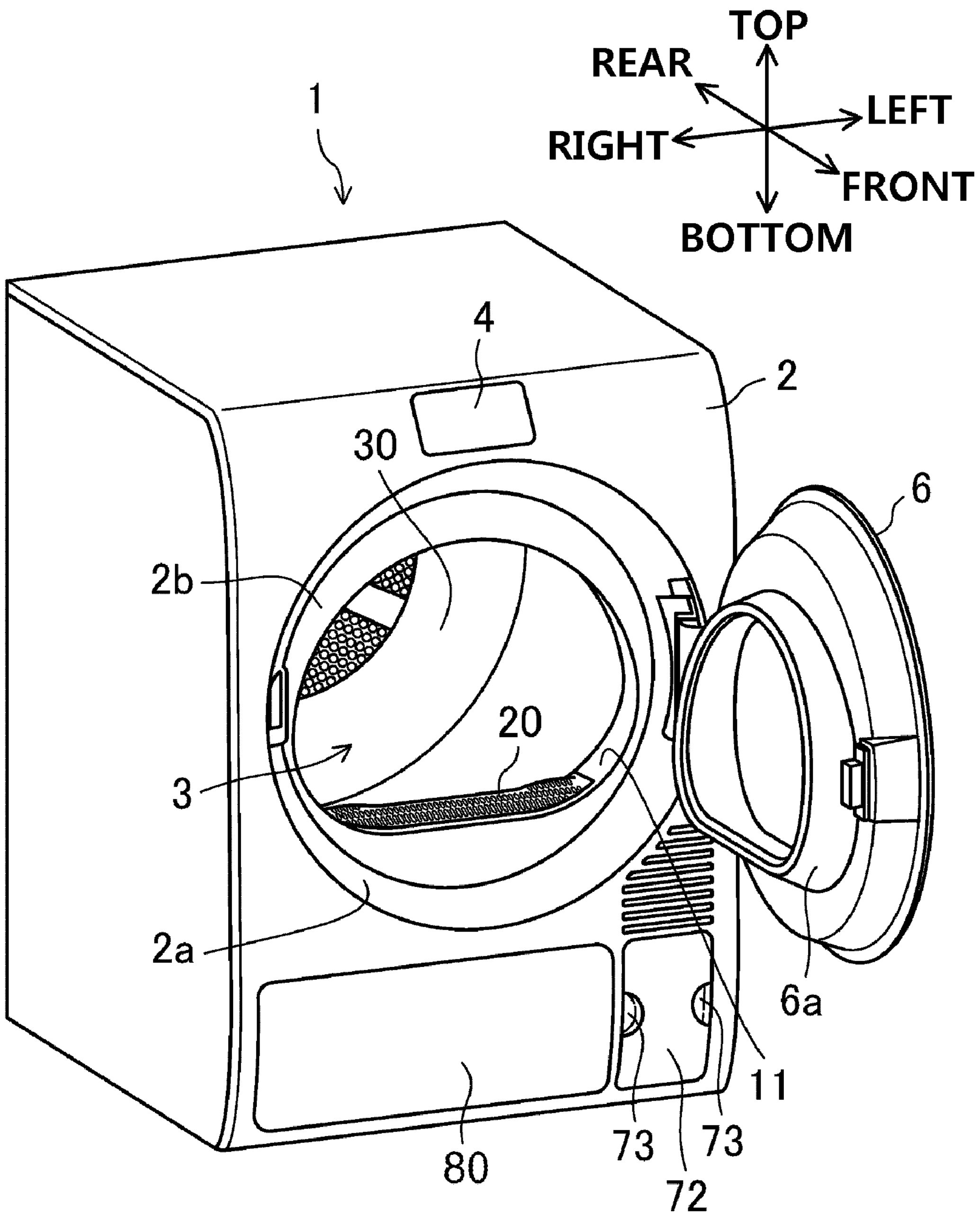
FIG. 1 is a view illustrating a clothes dryer according to an embodiment of the disclosure.

FIGS. 1 through 17C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments set forth herein and illustrated in the configuration of the disclosure are only the most preferred embodiments and are not representative of the full the technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Hereinafter, embodiments of the disclosure will be described in detail with reference to the accompanying drawings.

Figure 2:
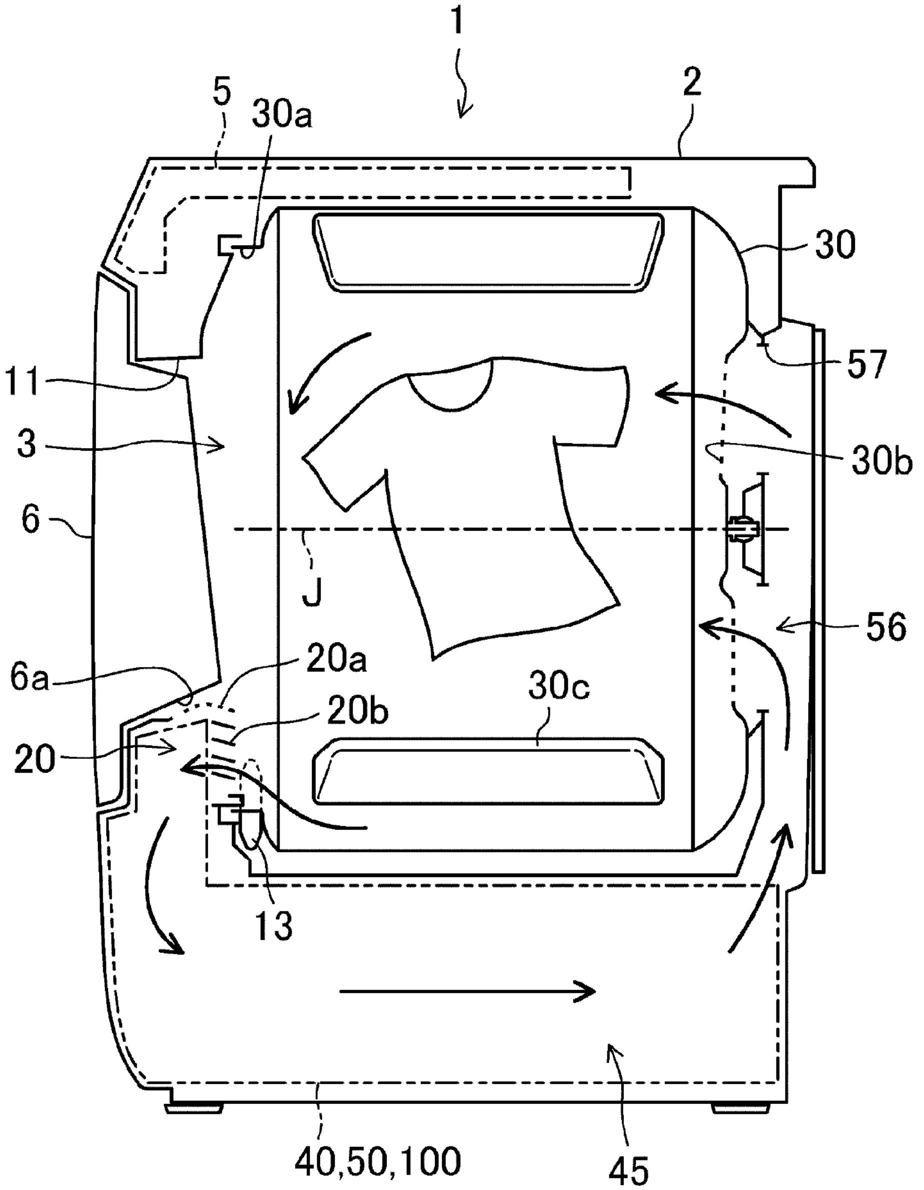
FIG. 2 is a cross-sectional view schematically illustrating an internal structure of the clothes dryer according to the embodiment of the disclosure.

FIG. 1 is a view illustrating a clothes dryer according to an embodiment of the disclosure. FIG. 2 is a cross-sectional view schematically illustrating an internal structure of the clothes dryer according to the embodiment of the disclosure.

Referring to FIGS. 1 and 2, a clothes dryer 1 according to an embodiment of the disclosure is described. The clothes dryer 1 is an air circulation type clothes dryer that may generate dry air while circulating air, and dry clothes with the generated dry air.

The clothes dryer 1 may include a cabinet 2 and an inlet 3. The cabinet 2 is formed in a substantially rectangular parallelepiped, and the inlet 3 may be formed in an upper portion of a front side of the cabinet 2 such that clothes is inserted into or withdrawn from the inlet 3.

The inlet 3 may have a horseshoe-shaped appearance. Specifically, an upper portion of the inlet 3 may be formed in a semicircular shape, and a lower end portion of the inlet 3 may be formed to extend in a horizontal direction.

A manipulator 4 including a touch panel may be installed at an upper side of the inlet 3. A controller 5 may be provided behind the manipulator 4 inside the cabinet 2. A door 6 may be coupled to the front side of the cabinet 2 through a hinge, and the inlet 3 may be opened and closed by the door 6.

Figure 5:
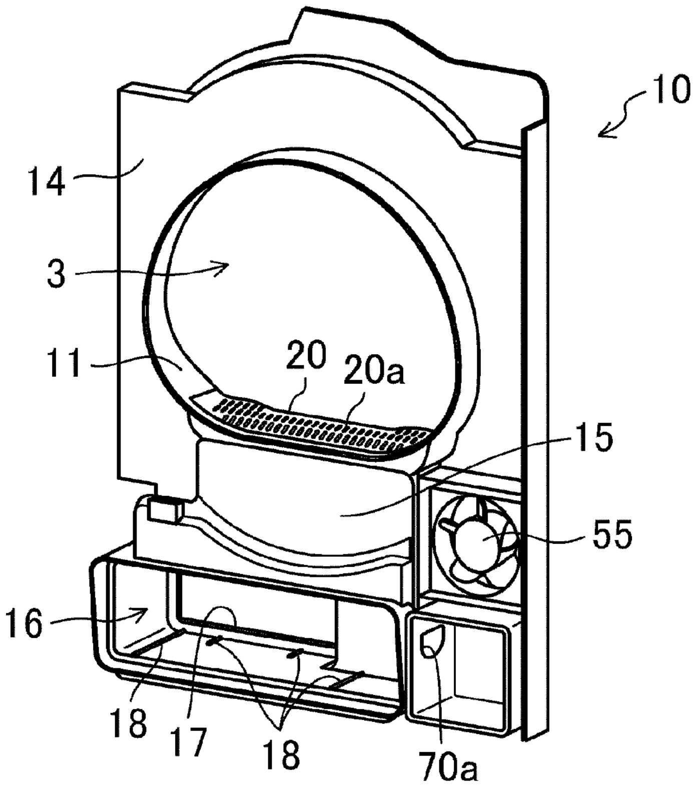
FIG. 5 is a schematic view illustrating a front wall of the clothes dryer according to the embodiment of the disclosure.
Figure 6:
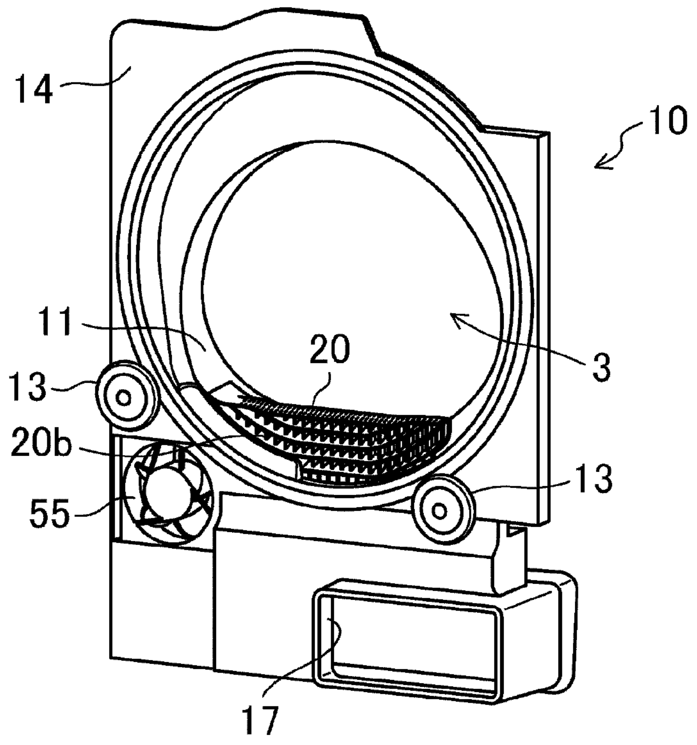
FIG. 6 is a view schematically illustrating a rear surface of the front wall of the clothes dryer according to the embodiment of the disclosure.

A front wall 10 is integrally assembled inside the front surface of the case 2 (see FIGS. 5 and 6). As the front wall 10 is assembled, an annular concave portion 2*a* recessed in an annular shape, an outer flange portion 2*b* protruding from an inner edge of the annular concave portion 2*a* to partition the entrance 3, a inner flange portion 11 protruding from an inner edge of the outer flange portion 2*b* toward the inside of the case 2, and the like are formed at a front portion of the case 2.

A door protrusion portion 6*a* to be fitted to the annular concave portion 2*a*, the outer flange portion 2*b*, and the inner flange portion 11 is provided on the entrance 3 side of the door 6. An exhaust port 20 is provided at a lower end portion of the inner flange portion 11.

A drum 30 for accommodating clothes may be installed inside the cabinet 2. An opening 30*a* for inserting and withdrawing clothes may be formed in the front of the drum 30. The drum 30 may be arranged with the opening 30*a* oriented to the inlet 3.

Figure 3:
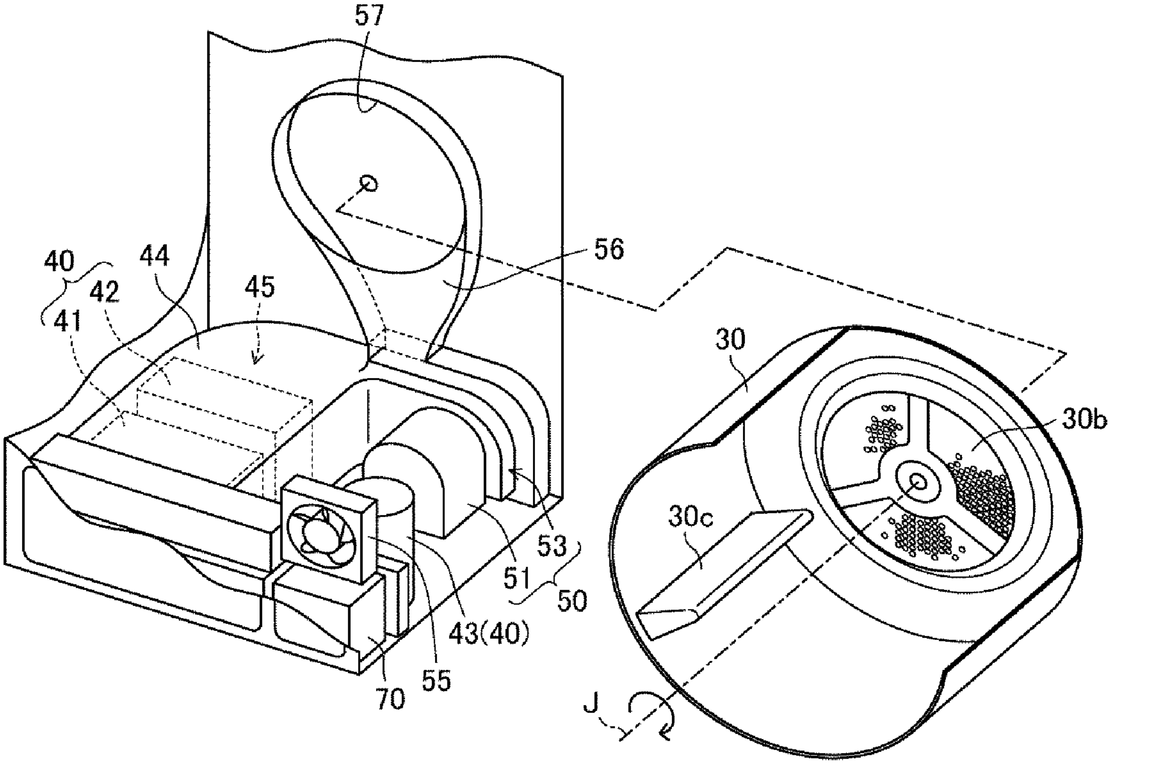
FIG. 3 is a schematic view illustrating a drum and a heat exchanger in the clothes dryer according to the embodiment of the disclosure.
Figure 4:
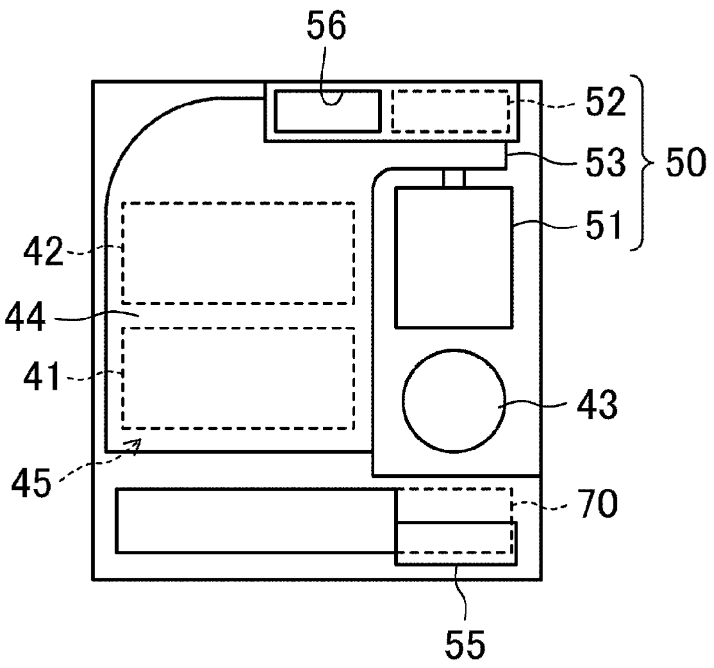
FIG. 4 is a plan view illustrating an arrangement of the drum and the heat exchanger in the clothes dryer according to the embodiment of the disclosure.

FIG. 3 is a schematic view illustrating a drum and a heat exchanger in the clothes dryer according to the embodiment of the disclosure. FIG. 4 is a plan view illustrating an arrangement of the drum and the heat exchanger in the clothes dryer according to the embodiment of the disclosure.

Referring to FIGS. 3 and 4, the drum 30 may be formed in a cylindrical shape. In addition, the drum may be supported by the cabinet 2 so as to be rotatable about a rotation shaft extending in the front and rear direction.

Specifically, the central portion of the rear end of the drum 30 is coupled to the rear portion of the cabinet 2, and the peripheral edge portion of the front end of the drum 30 is supported by a plurality of guide rollers 13 installed at the front portion of the cabinet 2.

A ventilation port 30*b* having a circular shape and covered with a mesh filter may be formed at the rear end of the drum 30.

A stirring plate 30*c* may be attached to an inner surface of the drum 30. The stirring plate 30*c* may be formed integrally with the drum 30. However, the disclosure is not limited thereto. During a drying operation, the drum 30 may be rotated by a driving motor (not shown).

The clothes dryer may include a heat exchanger 40, a blowing apparatus 50, a lint removal apparatus 100, and a lint box 70. The heat exchanger 40, the blowing apparatus 50, the lint removal apparatus 100, and the lint box 70 may be disposed below the clothes dryer 1. Accordingly, a sufficient installation space may be ensured, and a large-sized, high-performance clothes dryer may be manufactured. In addition, since the center of gravity is lowered, the clothes dryer 1 may be stably installed. In addition, since the components are located below the drum 30 that generates vibration during drying operation, vibration may be suppressed.

In addition, as will be described below, the air circulation path is enlarged and simplified, so that air resistance may be reduced to reduce pressure loss, and air flowing out of the drum 30 may be smoothly guided to the heat exchanger 40.

The heat exchanger 40 is composed of an evaporator 41, a condenser 42, a compressor 43, and the like.

The evaporator 41 and the condenser 42 both have an outer appearance of a rectangular parallelepiped shape with the transverse width larger than the longitudinal width and are accommodated and arranged in the duct cover 44 side by side in the front-rear direction. That is, the heat exchanger 40 is disposed in the exhaust duct 45.

The heat exchanger 40 is disposed further downstream than the lint removal apparatus 100 along a direction (see the arrows in FIG. 2) in which air flows inside the exhaust duct 45.

According to the embodiment of the disclosure, the lint removal apparatus 100 may be assembled to a lint case 60 which will be described below, and may be disposed on the front side of the lower portion of the clothes dryer 1. The lint removal apparatus 100 may be disposed in an exhaust duct 45 through which air from the drum 30 flows.

The blowing apparatus 50 may include a blowing motor 51, a blowing fan 52, and a fan cover 53. The blowing apparatus 50 may be disposed downstream from the heat exchanger 40 in a direction in which air flows inside the exhaust duct 45.

An outside air introduction fan 55 for introducing outside air into the cabinet 2 may be disposed in front of a compressor 43. The outside air introduction fan 55 may be coupled to a front wall 10.

The blowing fan 52 may include a centrifugal fan, but is not limited thereto. In addition, the blowing fan 52 may be covered by the fan cover 53. The fan cover 53 may be provided with a suction port and a discharge port, and the suction port may be connected to a downstream side of the exhaust duct 45.

The clothes dryer may further include a supply duct 56. The supply duct 56 may be installed along the inner surface of the rear wall of the cabinet 2. The discharge port of the fan cover 53 may be connected to one end of the supply duct 56.

A supply port 57 may be formed at the other end of the supply duct 56. The supply port is illustrated in a circular shape, but is not limited thereto and may include various shapes. The supply duct 56 may communicate with the rear portion of the drum 30 through the supply port 57 and the ventilation port 30*b*.

During drying operation, the blowing fan 52 is rotated by the drive of the blowing motor 51 to generate a flow of air that is directed from the exhaust port 20 to the supply port 57. Accordingly, circulation of air passing through the drum 30 is formed (see an arrow in FIG. 2). By the blower fan 52 and the heat exchanger 40, humid air is discharged from the drum 30 through the opening 30*a* and the exhaust port 20, and dry air is introduced into the drum 30 through the supply port 57 and the ventilation port 30*b*.

FIG. 5 is a schematic view illustrating a front wall of the clothes dryer according to the embodiment of the disclosure. FIG. 6 is a view schematically illustrating a rear surface of the front wall of the clothes dryer according to the embodiment of the disclosure.

Referring to FIGS. 5 and 6, the front wall 10 may be included in the cabinet 2, and may be coupled to the front inner side of the cabinet 2.

The front wall 10 includes a support frame 14 attached to the front inner side of the cabinet 2, and the outside air introduction fan 55 and the exhaust port 20 may be installed on the support frame 14. The guide roller 13 may be installed on the inner surface of the support frame 14.

The inner flange portion 11 may be formed by the support frame 14, and a connection duct 15 may be formed at a lower side of the inner flange portion 11. The exhaust port 20 may be provided at a lower end portion of the inner flange part 11.

The connection duct 15 may extend in a vertical direction from the exhaust port 20 toward the lower side, and may connect the exhaust port 20 to the exhaust duct 45. The connection duct 15 may be provided to have a vertical width greater than a horizontal width while extending in the vertical direction. The lower end portion of the connection duct 15 may communicate with the exhaust duct 45.

The connection duct 15 may be provided at a lower side thereof with an accommodation space 16 including a part of the exhaust duct 45 and elongated in the horizontal direction. The lint removal apparatus 100 and the lint case 60 to be described below may be mounted in the accommodation space 16.

The accommodation space 16 is provided at an inside thereof with an opening having a rectangular shape elongated in the horizontal direction. The opening may be integrally connected to an air inlet 17 provided on the front side of the exhaust duct 45.

The lint box 70 may be disposed on one side of the accommodation space 16.

The outside air introduction fan 55 may be disposed at an upper side of the lint box 70.

A plurality of ribs 18 extending in a front-rear direction is formed on a bottom surface of a portion where the lint case 60 is disposed inside the case 2, that is, on the bottom surface 2*c* of the case 2 constituting the accommodation space 16. The lint case 60 may be fitted into the accommodation space 16.

An inner side of the upper portion of the connection duct 15 may be connected to the exhaust port 20. An upper portion 20*a* of the exhaust port 20 may be formed in a rectangular shape elongated in a horizontal direction. An inner portion 20*b* of the exhaust port 20 may be formed in an inverted arch shape.

The center in the horizontal direction of the exhaust port 20 may be located below the center of the drum 30.

Therefore, air may evenly and stably discharged without being affected by the rotation of the drum 30.

As shown in FIG. 2, when the door 6 is closed, the upper portion 20*a* of the exhaust port 20 may be provided to be disposed vertically opposite to a door protruding portion 6*a* of the door 6 with a gap therebetween. The exhaust port 20 may communicate with the front portion of the drum 30 when the door 6 is closed.

During the drying operation, air in the drum 30 may be mainly guided to the connection duct 15 through the inner portion 20*b* of the exhaust port 20 to flow downward.

As shown in FIG. 2, the exhaust duct 45 may extend in a direction (left and right directions) crossing the vertical direction in which the connection duct 15 extends. The exhaust duct 45 communicates with the lower end portion of the connection duct 15 while extending rearward.

Further, the exhaust duct 45 may form an L-shaped flow path when viewed from the left and right sides.

The accommodation space 16 may be disposed at a portion where the exhaust duct 45 and the connection duct 15 communicate with each other. In the following description, the portion in which the exhaust duct 45 and the connection duct 15 communicate with each other may be defined as the accommodation space 16.

Figure 7:
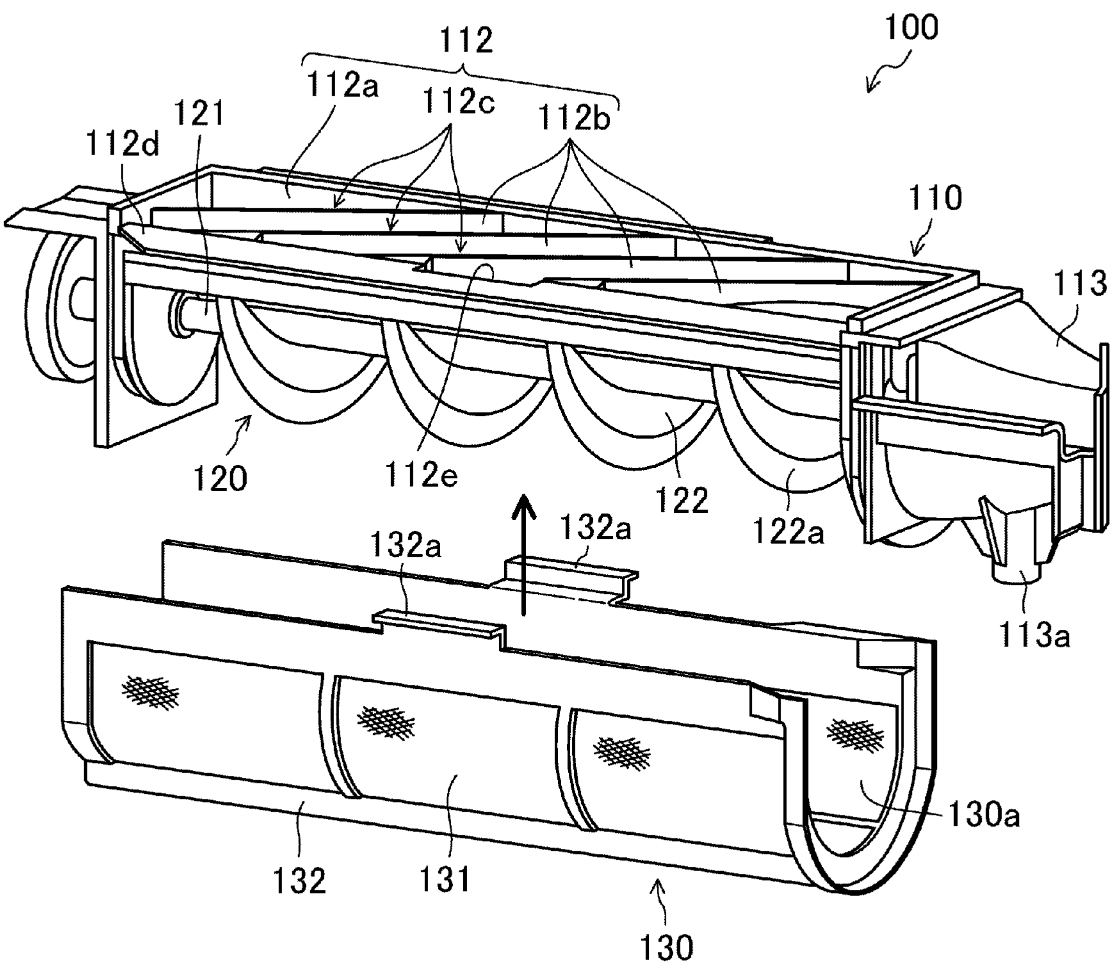
FIG. 7 is a view illustrating a lint removal apparatus in the clothes dryer according to the embodiment of the disclosure.
Figure 8:
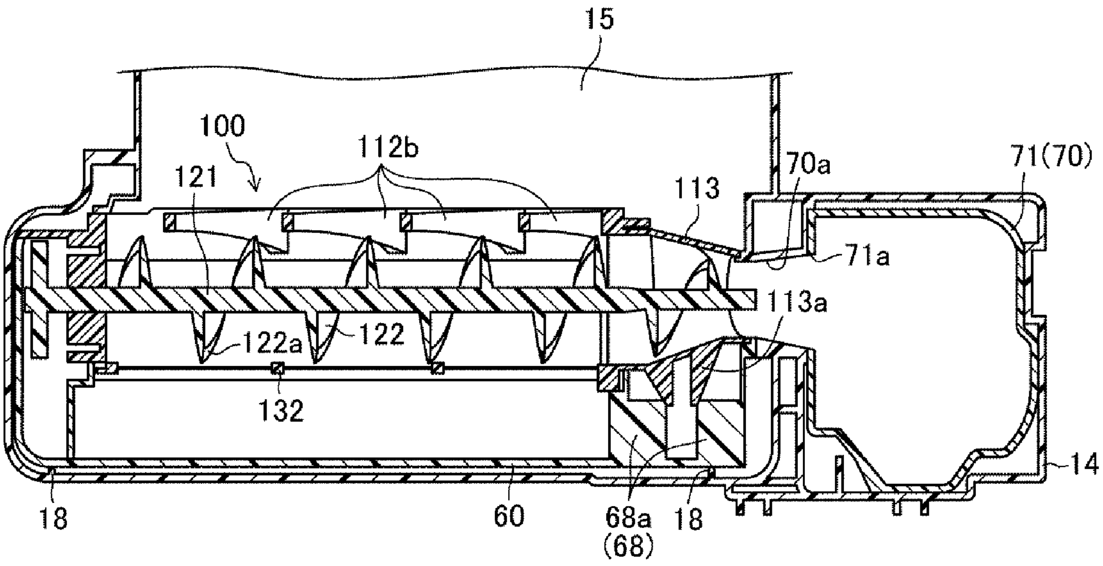
FIG. 8 is a cross-sectional view illustrating the lint removing device shown in FIG. 7.

FIG. 7 is a view illustrating a lint removal apparatus in the clothes dryer according to the embodiment of the disclosure. FIG. 8 is a cross-sectional view illustrating the lint removing device shown in FIG. 7.

Figure 9:
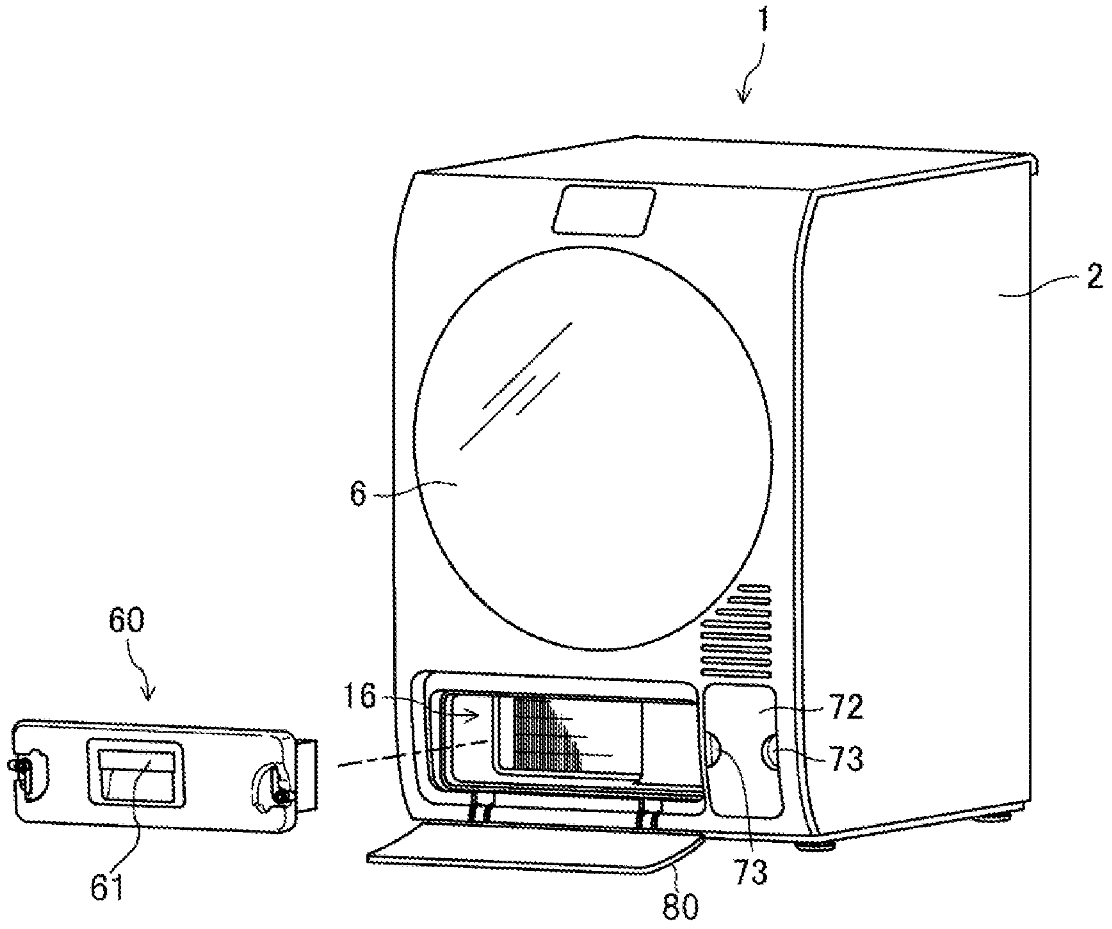
FIG. 9 is a view illustrating a process of separating a lint case in the clothes dryer according to the embodiment of the disclosure.

Referring to FIGS. 7 to 9, the lint removal apparatus 100 is an apparatus for removing lint in the air flowing out of the exhaust port 20.

The lint removal apparatus 100 may include a frame member 110, a rotation member 120, and a lint filter 130.

The rotation member 120 may include a rotation shaft 121 and a fin 122 provided on the rotation shaft 121 and having spiral shape. The fin 122 may include a plurality of fins 122 disposed to be spaced apart from each other along the axial direction of the rotation shaft 121, and the plurality of fins 122 may be designed to have the same outer diameters. However, the disclosure is not limited thereto. Some of the above components may be omitted.

The rotation member 120 is coupled at one end thereof to a driving device including a motor 143*a* to generate power for rotating the rotation member 120.

The frame member 110 may include a lint processing part 112 and a lint lead-out part 113. Some of the above components may be omitted.

Referring to FIG. 7, the lint processing part 112 includes a main body 112*a* including a rectangular frame, and a plurality of gratings 112 extending in an inclined form while intersecting the axial direction of the rotation shaft 121 of the rotation member 120. In this case, the rotation shaft 121 may be referred to as a second rotation shaft 121. A first rotation shaft 182 will be described below.

An air introduction port 112*c* is formed between the frame body 112*a* and the grating 112*b* and between the gratings 112*b* adjacent to each other, and air passing through the connection duct 15 is introduced into the lint filter 130 from the air introduction port 112*c*.

The grating 112*b* may include a lower surface facing the lint filter 130, and the lower surface of the grating 112*b* may include a curved surface concave upward. The shape of the curved surface may correspond to a part of a rotation trajectory of the rotation member 120.

The lint processing part 112 is provided with two protrusions 112*d* protruding forward and rearward from the front end and the rear end of the frame body 112*a*, respectively. The protrusions 112*d* may support the lint filter 130. In addition, the protrusions 112*d* may support the lint removal apparatus 100 while the lint removal apparatus 100 is coupled to the lint case 60.

The lint filter 130 may have a U-shaped cross section and may be formed to be elongated in the horizontal direction in the lint processing part 112. In addition, the lint filter 130 may be detachably coupled to the lint processing part 112. Some of the above components may be omitted.

The lint filter 130 includes a mesh filter 131 having a sheet shape and including a hole through which lint does not pass, and a filter frame 132 elongated in a horizontal direction with a U-shaped cross-section while supporting the mesh filter 131.

The lint filter 130 may be provided at an inside thereof with a collecting surface 130*a* having an arc-shaped cross-section. The collecting surface 130*a* may be disposed to face the upstream side of the air flow path.

As shown in FIG. 8, the inner diameter of the collecting surface 130*a* may be provided larger than the outer diameter of the fin 122 of the rotation member 120, and a rubber plate 122*a* configured to come in contact with the collecting surface 130*a* may be attached to the outer side of the fin 122.

The lint filter 130 may be detachably provided on the frame member 110.

The filter frame 132 may be formed of an elastic material, and may include protrusions 132*a* formed at opposite side upper ends thereof. A locking portion 112*e* having a shape corresponding to the protrusion 132*a* may be formed in the protrusion 112*d* of the lint processing part 112.

When the filter frame 132 is pushed to cover the rotation member 120 from the lower side of the frame member 110, the filter frame 132 is elastically deformed, so that each protrusion 132*a* is caught with a corresponding one of the locking portions 112*e*. Accordingly, the lint filter 130 is caused to be mounted on the lint processing part 112.

The lint removal apparatus 100 may be set to operate for a certain time after the operation of the clothes dryer 1 ends or before the operation starts, for example, when the blowing apparatus 50 or the heat exchanger 40 is not operated.

Lint in the air circulating during the drying operation is captured by the lint filter 130 and accumulated on the collecting surface 130*a*. The lint filter 130 may be designed in a size and shape that does not cause clogging by the amount of lint generated in at least one time of drying operation.

After the drying operation is finished, a film-shaped lint lump may be generated by the lint remaining on the collecting surface 130*a*. As the rotation member 120 rotates, the lint film may be scraped off from the lint filter 130 by the rotation member 120 and pushed out to one side of the lint filter 130.

Meanwhile, a gap may be set to exist between the fin 122 and the collection surface 130*a* without the rubber plate 122*a* attached to the fin 122 as long as the lint film can be scraped off. In this case, a protrusion configured to be caught with the lint film while in contact with the collecting surface 130*a* may be provided on a portion of the tip of the fin 122.

The lint removal apparatus 100 may not operate during the drying operation. Since the lint removal apparatus 100 may collectively remove lint before or after the drying operation, lint may be removed in a short time. Therefore, complicated control and high-function devices are not required, and relevant costs may be reduced.

The lint lead-out part 113 may be located adjacent to one side of the lint processing part 112. The lint lead-out part 113 may guide the lint film pushed out from the lint filter 130 to the lint box 70.

The lint lead-out part 113 may be provided in a tapered shape in which a cross-sectional area thereof decreases as being directed toward the lint box 70 in the axial direction of the rotation shaft 121. The lint lead-out part 113 may include a protrusion 113*a* protruding downward from the lower surface thereof. As will be described below, the protrusion 113*a* may support the lint removal apparatus 100 while the lint removal apparatus 100 is attached to the lint case 60.

The lint box 70 may be disposed at one side of the lint lead-out part 113 and store a lint film scraped from the collecting surface 130*a*.

Since the lint box 70 is disposed adjacent to one side end of the lint filter 130, the lint film may be easily transferred to the lint box 70 without installing a complicated transfer mechanism.

The lint box 70 may include an accommodating portion 71 for accommodating a lint film, and a box front 72 installed to cover the front side of the accommodating portion 71 and attached to the cabinet 2.

The accommodating portion 71 of the lint box 70 may communicate with the lint lead-out portion 113 through a lint conveying port 70*a* formed in an upper right portion of the accommodation space 16 and a lint accommodating port 71*a* formed in an upper left portion of the accommodating portion 71. Accordingly, the lint film scraped off from the lint filter 130 may be transferred into the accommodating portion 71 of the lint box 70.

The lint box 70 of the clothes dryer 1 may be formed separately from the lint case 60 and may be detachably installed on the lower portion of the cabinet 2.

Although not shown in FIG. 8, the lint removal apparatus 100 may include a driving device 140 and a coupling device 150 disposed on the right side of the lint removing apparatus 100.

As shown in FIGS. 1 and 9, gripping portions 73 are provided on left and right sides of the box front 72 of the lint box 70. The lint box 70 may be separated from the cabinet 2 by pulling the gripping portion 73 forward.

In addition, the box front 72 may be provided to be partly transparent, and allow the amount of lint accumulated in the lint box 70 to be checked without separating the lint box 70 from the cabinet 2. However, the disclosure is not limited thereto, and the box front 72 of the lint box 70 may not have a transparent portion.

The clothes dryer may include a front cover 80 provided in front of the lint case 60 to open the lint case 60. That is, the lint case 60 may be accommodated at an inside of the front cover 80.

The lint case 60 may be provided at an inside thereof with a handle 61 provided to withdraw the lint removal apparatus when the front cover 80 is opened.

The lint case 60 is provided with a support portion 68 for supporting the lint removal apparatus 100 in a state in which the lint removal apparatus 100 is accommodated in the accommodation space 16.

A support protrusion 68*a* extending toward the center of the support portion 68 is formed on the support portion 68, and the protrusion 113*a* of the lint lead-out part 113 of the lint removal apparatus 100 is coupled to an upper end of the support protrusion 68*a*.

Figure 10A:
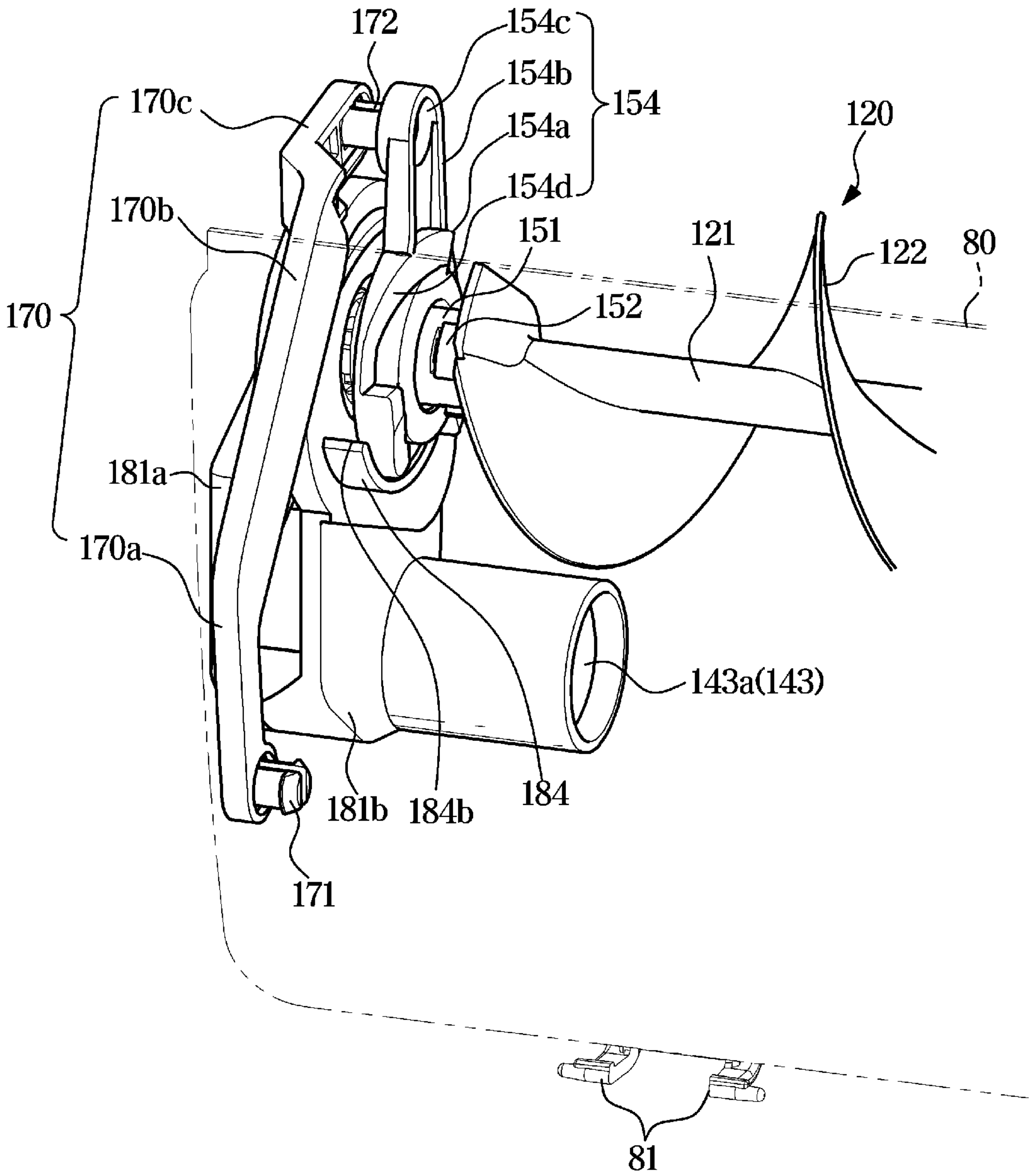
FIG. 10A is a view illustrating a coupling device coupled to a driving device in the clothes dryer according to the embodiment of the disclosure.
Figure 10B:
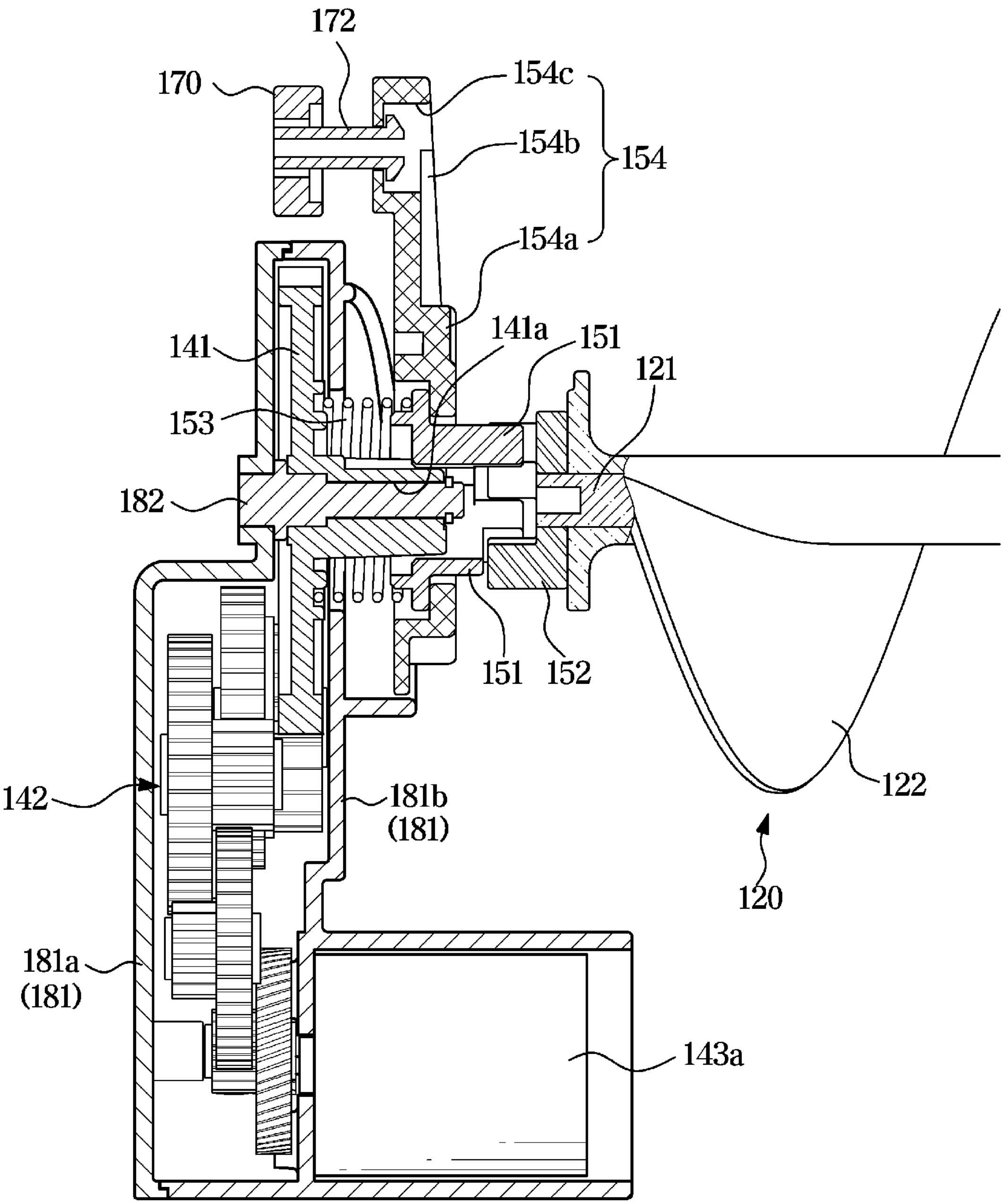
FIG. 10B is a cross-sectional view illustrating the driving device and the coupling device in the clothes dryer shown in FIG. 10A.
Figure 11A:
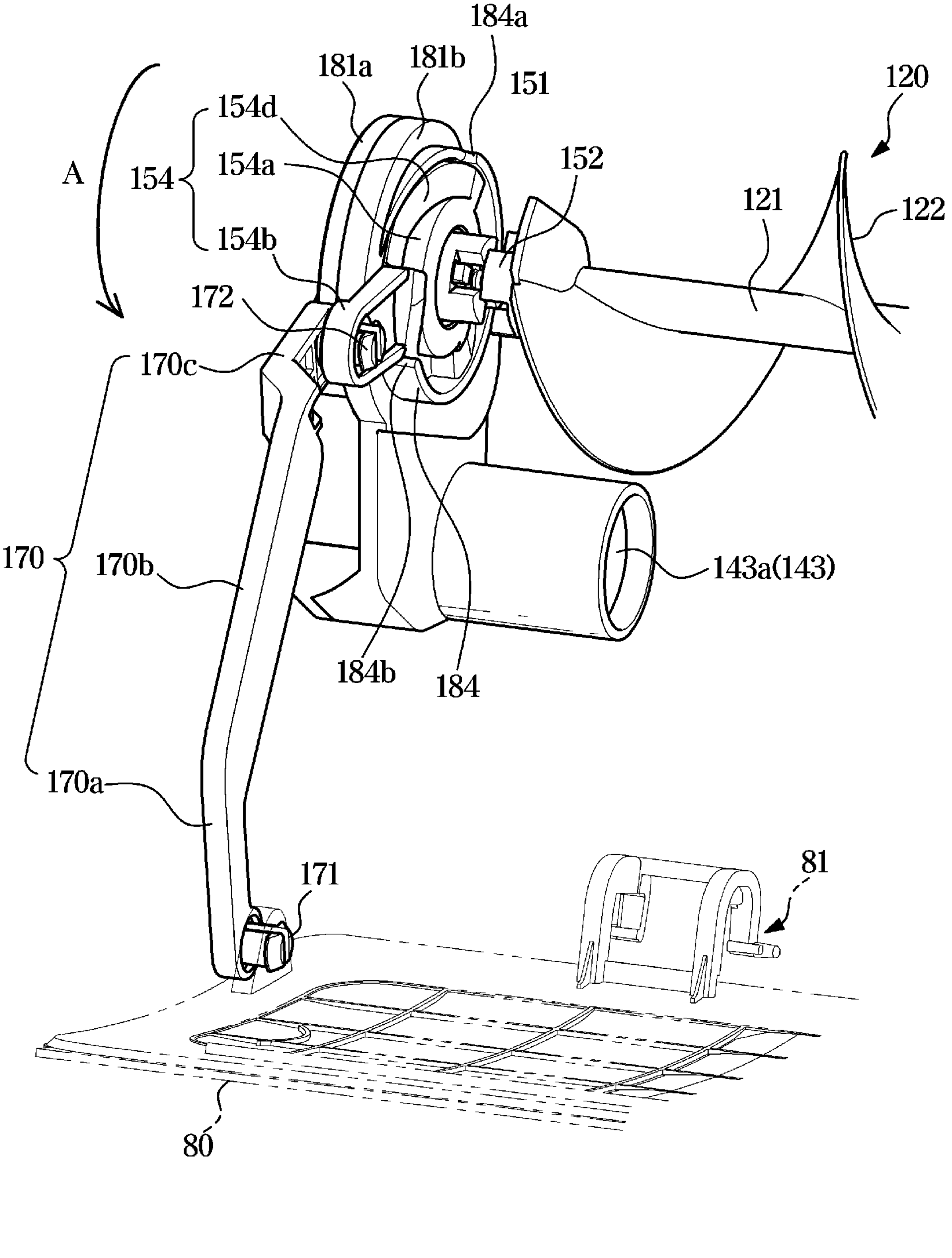
FIG. 11A is a view illustrating the coupling device separated from the driving device in the clothes dryer according to the embodiment of the disclosure.
Figure 11B:
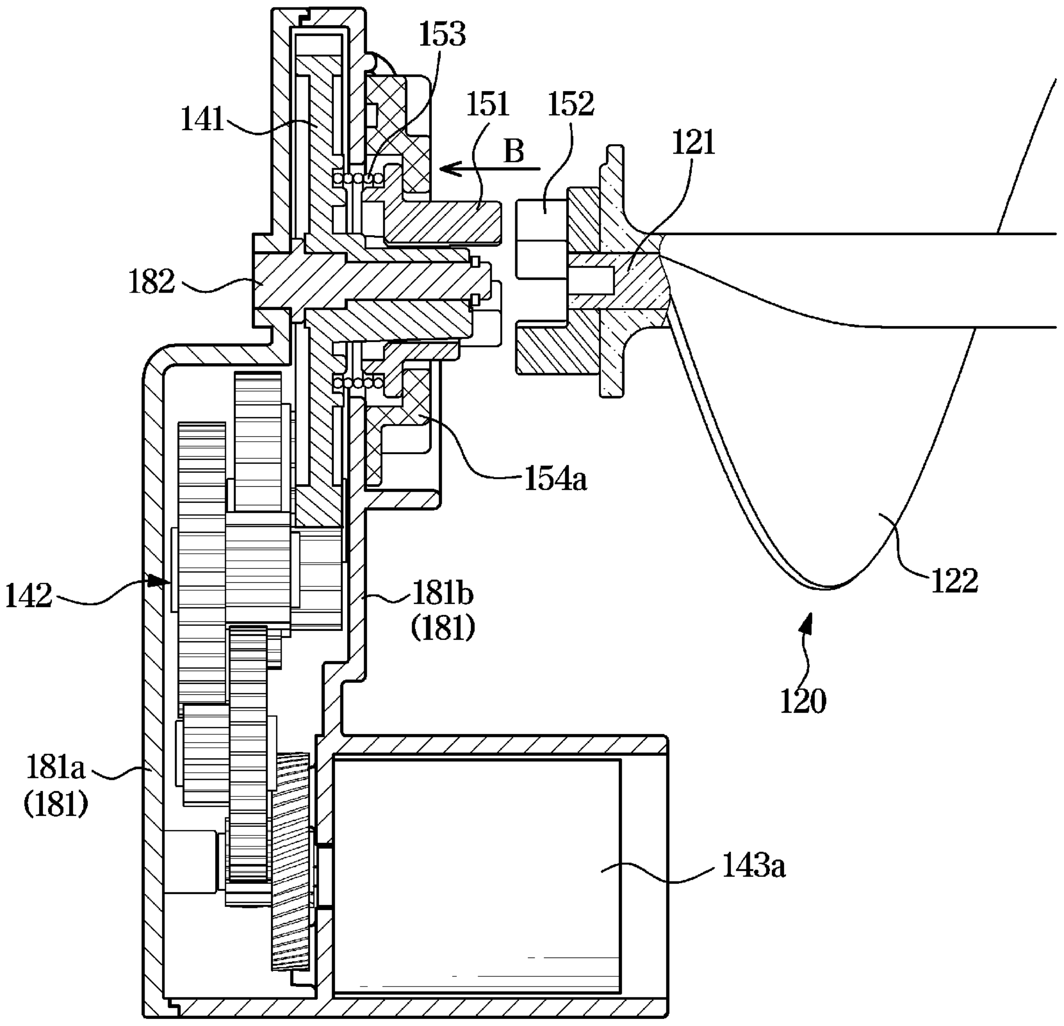
FIG. 11B is a cross-sectional illustrating showing the driving device and the coupling device in the clothes dryer shown in FIG. 11A.

FIG. 10A is a view illustrating a coupling device coupled to a driving device in the clothes dryer according to the embodiment of the disclosure. FIG. 10B is a cross-sectional view illustrating the driving device and the coupling device in the clothes dryer shown in FIG. 10A. FIG. 11A is a view illustrating the coupling device separated from the driving device in the clothes dryer according to the embodiment of the disclosure. FIG. 11B is a cross-sectional illustrating showing the driving device and the coupling device in the clothes dryer shown in FIG. 11A.

Referring to FIGS. 10A to 11B, the clothes dryer may further include a link member 170. The front cover 80 may be connected to the link member 170 that is rotated through opening of the front cover 80. The link member 170 may be connected to a holder 154 of the coupling device 150 to be described below, and the holder 154 may be provided to rotate together with the link member 170 to separate a first coupler 151 and a second coupler 152 of the coupling device 150 from each other.

When the first coupler 151 and the second coupler 152 are separated from each other, the lint removal apparatus 100 may be removed from the clothes dryer 1 using the handle 61 described above. Such a configuration may facilitate cleaning of the lint removal apparatus 100 and replacement of the lint filter 130.

The lint removal apparatus 100 may include a case 181, the driving device 140, and the coupling device 150.

The driving device 140 may include a plurality of gears 142, and include the motor 143*a* connected to the plurality of gears 142. The motor 143*a* may operate to produce power.

Power produced through the plurality of gears 142 connected to the motor 143*a* may be transmitted to the rotation member 120. Accordingly, the rotation member 120 may scrape off the lint film accumulated in the lint filter 130 to deliver the lint film to the lint box 70.

The case 181 may be formed to surround the driving device 140. The case 181 may include a first case 181*a* formed to surround the plurality of gears 142 and a second case 181*b* formed to surround a terminal gear 141 to be described below.

The first case 181*a* may include the first rotation shaft 182. The terminal gear 141 to be described below may be coupled to the first rotation shaft 182.

The driving device 140 may include the terminal gear 141. The terminal gear 141 may transmit power to the coupling device 150. The terminal gear 141 may be elastically biased by an elastic member 153. The terminal gear 141 may be connected to the plurality of gears 142 to receive power from the motor 143*a*. The terminal gear 141 may have a protrusion 141*a* extending in the axial direction. The protrusion 141*a* may be formed in a shape corresponding to that of the first coupler 151 so as to be coupled to the first coupler 151. That is, the protrusion 141*a* may include a flange (not shown) radially protruding therefrom. Power transmitted from the motor 143*a* may be connected to the first coupler 151 and the second coupler 152 to operate the rotation member 120.

The coupling device 150 may include the first coupler 151, the second coupler 152, the elastic member 153, and the holder 154.

The first coupler 151 may be coupled to the protrusion 141*a* of the terminal gear 141 to transmit power to the second coupler 152. In the drawings, the first coupler 151 and the terminal gear 141 are illustrated as separate components, but are not limited thereto and may be integrally formed with each other. The first coupler 151 may be formed with a hole (not shown) to correspond to the flange protruding from the terminal gear 141. That is, the flange may be coupled to the hole of the first coupler 151.

The second coupler 152 may be arranged to be coupled to the first coupler 151. The second coupler 152 may have a shape corresponding in shape to the first coupler 151 so as to be coupled to the first coupler 151. The second coupler 152 may be coupled to the second rotation shaft 121 to transmit power to the rotation member 120.

According to the concept of the disclosure, the first coupler 151 and the second coupler 152 are used in coupling and separation the lint removal apparatus 100, so that gears may be prevented from being broken due to using the gears when transmitting power, and long-term use of the lint removal apparatus 100 may be ensured.

The elastic member 153 may be disposed between the first coupler 151 and the terminal gear 141. The elastic member 153 may include a spring. The use of the elastic member 153 may increase the coupling stability of the first coupler 151 and the second coupler 152. In addition, since compression occurs during separation, when first coupler 151 and the second coupler 152 are recoupled to each other, the first coupler 151 and the second coupler 152 may be recoupled with a small force due to the restoring force of the elastic member 153.

When the front cover 80 is opened, the link member 170 and the holder 154 rotate, so that the first coupler 151 and the second coupler 152 may be separated from other. In this case, the elastic member 153 may receive a compressive force exerting toward the terminal gear 141. The elastic member 153, upon receiving the compressive force, may be compressed until the front cover 80 is completely opened. Therefore, the more the front cover 80 is opened, the more force is used to open the front cover 80.

Since the front cover 80, the link member 170, and the holder 154 operate in connection with each other, a user may allow the first coupler 151 and the second coupler 152 to be coupled to or separated from each other in a single operation by opening or closing the front cover 80.

The holder 154 may be formed to have a shape corresponding to that of the frame member 110. That is, the holder 154 may be formed to have a holder inclined surface **154*d*. With such a shape, the holder 154 may be prevented from being separated, and the holder 154 may be rotated while sliding along the holder inclined surface 154*d* through rotation of the front cover 80**.

The holder 154 may include a holder body **154*a* and a holder arm 154*b*. The holder body 154*a* may be formed in a circular shape. The holder arm 154*b* may be formed to protrude in the radial direction of the holder body 154*a*. The holder body 154*a* and the holder arm 154*b*** may be integrally formed with each other. However, the disclosure is not limited thereto.

The holder 154 may be connected to the link member 170 to rotate according to the opening and closing of the front cover 80. As the front cover 80 is opened, the holder 154 may be rotated in direction A and moved in direction B. In addition, as the holder 154 rotates, the degree of compression of the elastic member 153 may be changed. With the front cover 80 closed, the holder arm **154*b*** may be disposed to face the upper side.

When the front cover 80 is opened, the holder 154 may rotate in direction A. In this case, the holder arm **154*b*** may be disposed to face the front side.

Since the holder 154 rotates in direction A while moving in direction B, an insertion hole **154*c* coupled to a second fastening portion 172 may approach a third portion 170*c* of the link member 170 through the second fastening portion 172. That is, when the front cover 80 is open, the third portion 170*c* of the link member 170 and the insertion hole 154*c*** may be disposed closest to each other.

The holder arm **154*b* may include the insertion hole 154*c*. The insertion hole 154*c* may be provided such that the link member 170 is coupled to the end of the holder arm 154*b***.

The link member 170 may include a first portion **170*a*, a second portion 170*b*, and a third portion 170*c*. One end of the first portion 170*a* may include a first fastening portion 171 to be connected to the front cover 80. That is, the first portion 170*a* may be disposed adjacent to the front cover 80. The second portion 170*b* may be disposed between the first portion 170*a* and the third portion 170*c* to connect the first portion 170*a* to the third portion 170*c*. A connection portion between the first portion 170*a* and the second portion 170*b* may be connected in a bent shape. In addition, a connection portion between the second portion 170*b* and the third portion 170*c* may be connected in a bent shape. One end of the third portion 170*c* may include the second fastening portion 172 to be connected to the holder arm 154*b*. That is, the third portion 170*c* may be disposed adjacent to the holder 154. The insertion hole 154*c* provided in the holder arm 154*b* may be coupled to the second fastening portion 172 through press-fitting. The holder arm 154*b* and the second fastening portion 172 may be detachably coupled to each other. However, the disclosure is not limited thereto and the holder arm 154*b* and the second fastening portion 172** may be integrally formed with each other.

The front cover 80 may be coupled to the lint case 60 through a hinge portion 81 provided on one side thereof.

The case 181 may include a stopper 184. That is, the stopper 184 may be provided at one side of the second case **181*b* to limit the rotation angle and distance of the holder 154. When the front cover 80 is closed, rotation of the holder arm 154*b* in direction A may be limited by a first portion 184*a* of the stopper 184. On the other hand, when the front cover 80 is opened, rotation of the holder arm 154*b* in direction A may be limited by a second portion 184*b* of the stopper 184**.

Due to the stopper 184, the holder 154 may not be excessively rotated, and the opening and closing of the front cover 80 and the coupling and separation of the first coupler 151 and the second coupler 152 may be effectively performed.

Figure 12A:
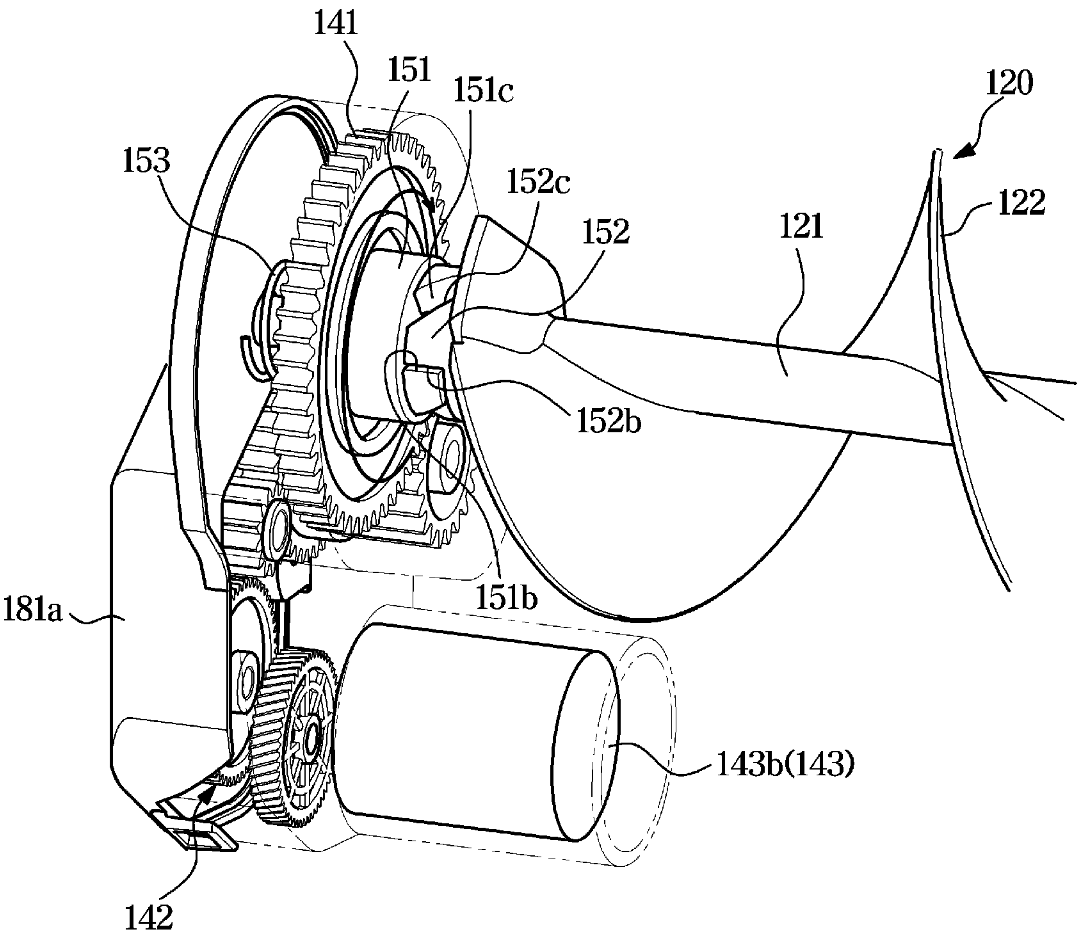
FIG. 12A is a view illustrating a coupling device coupled to a driving device in a clothes dryer according to another embodiment of the disclosure.
Figure 12B:
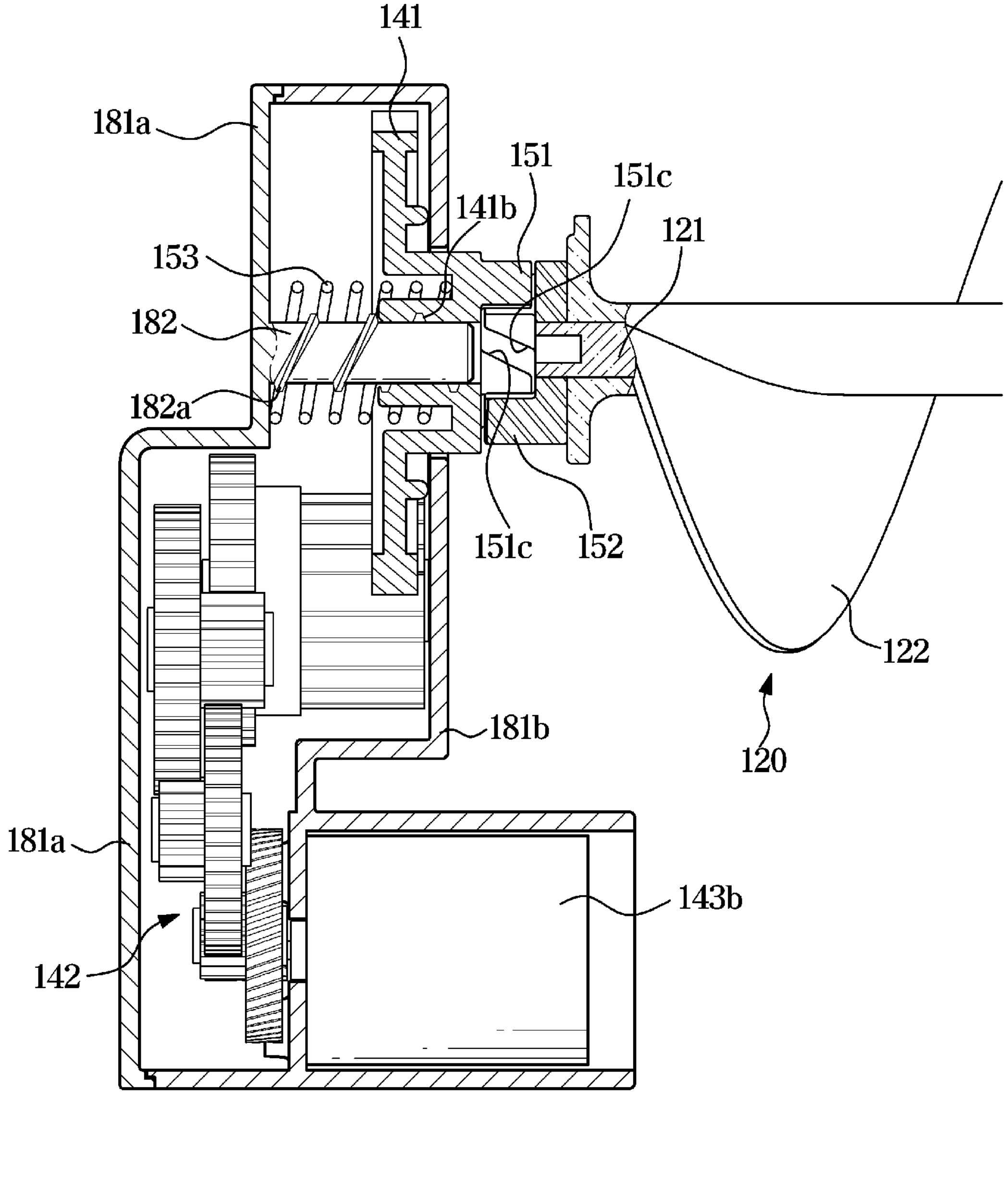
FIG. 12B is a cross-sectional view illustrating the driving device and the coupling device in the clothes dryer shown in FIG. 12A.
Figure 13A:
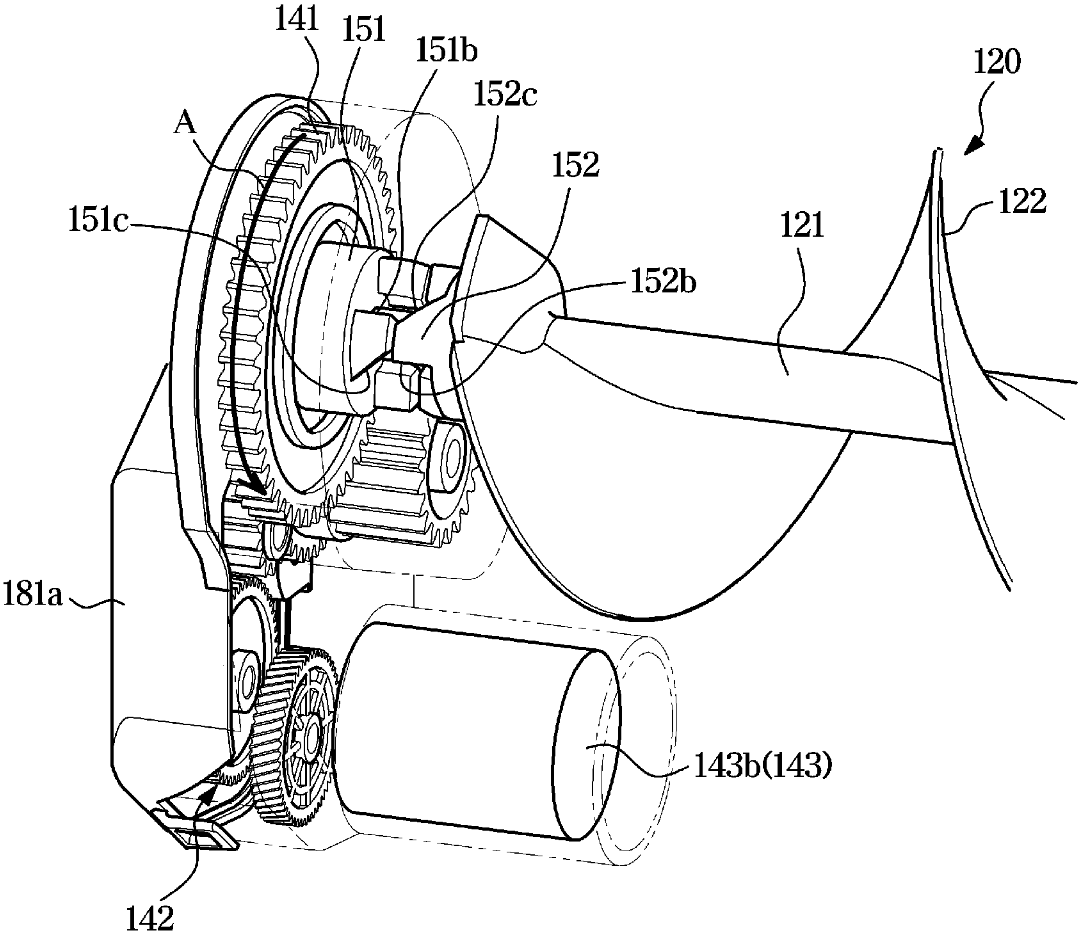
FIG. 13A is a view illustrating the coupling device separated from the driving device in the clothes dryer according to the another embodiment of the disclosure.
Figure 13B:
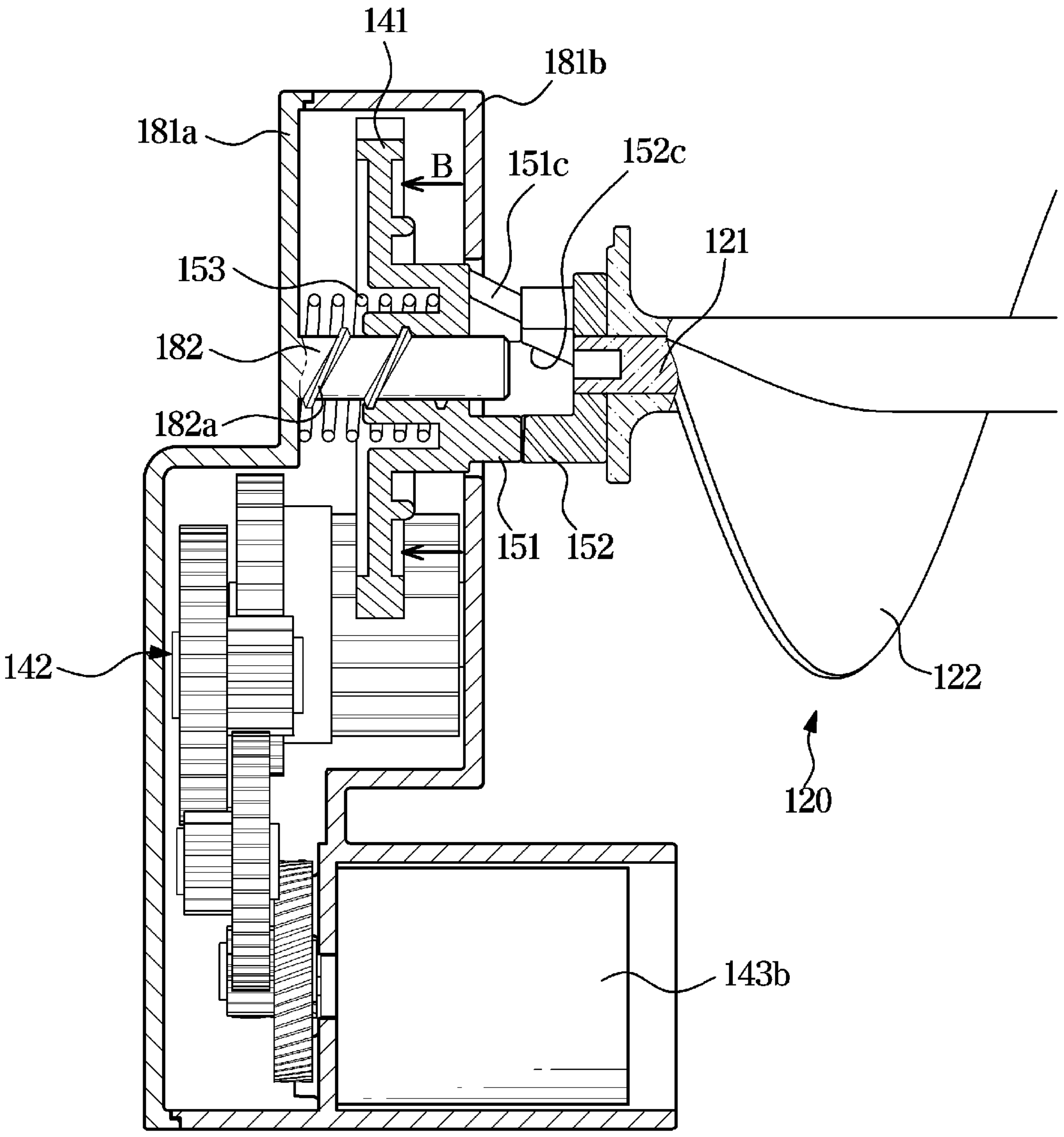
FIG. 13B is a cross-sectional view illustrating the driving device and the coupling device in the clothes dryer shown in FIG. 13A.

FIG. 12A is a view illustrating a coupling device coupled to a driving device in a clothes dryer according to another embodiment of the disclosure. FIG. 12B is a cross-sectional view illustrating the driving device and the coupling device in the clothes dryer shown in FIG. 11A. FIG. 13A is a view illustrating the coupling device separated from the driving device in the clothes dryer according to the another embodiment of the disclosure. FIG. 13B is a cross-sectional view illustrating the driving device and the coupling device in the clothes dryer shown in FIG. 13A.

Referring to FIGS. 12A to 13B, the first coupler 151 and the second coupler 152 may include coupling surfaces **151*b* and 152*b* and inclined surfaces 151*c* and 152*c*. That is, the first coupler 151 may include a first coupling surface 151*b* and a first inclined surface 151*c*, and the second coupler 152 may include a second coupling surface 152*b* and a second inclined surface 152*c*. The driving device 140 may include a driving motor 143*b*** capable of rotating in both directions.

The use of the driving motor **143*b* capable of rotating in both directions may allow the coupling device 150 to be separated without a user directly separating the first coupler 151 from the second coupler 152 from each other. The clothes dryer may further include a controller (not shown) to control the rotation direction of the driving motor 143***b* capable of rotating in both directions.

The first coupling surface 151*b* and the second coupling surface 152*c* may be engaged with each other so as to transmit power when the driving motor 143*b* rotates in the forward direction. In addition, the first inclined surface 151*c* and the second inclined surface 152*c* have an inclined shape such that the first coupler 151 and the second coupler 152 are separated from each other while sliding when the driving motor 143*b* rotates in the reverse direction. The length of the outer circumferential surface of the inclined surface 151*c* and 152*c* may be longer than the length of the inner circumferential surface of the inclined surface 152*c*. In addition, the slope on the inner circumferential surface may be formed steeper than the slope on the outer circumferential surface. However, the disclosure is not limited thereto and the inclined surfaces may be formed in various shapes.

Since the first coupler 151 and the second coupler 152 each include the coupling surfaces 151*b* and 152*b* and the inclined surfaces 151*c* and 152*c*, power may be effectively transmitted with the coupling surfaces 151*b* and 152*b* engaged with each other during the forward rotation, and the first coupler 151 and the second coupler 152 may be easily separated from each other through the inclined surface 151*c* and 152*c* during the reverse rotation.

When the driving motor 143*b* capable of both direction rotations rotate in the forward direction, the rotation member 120 may rotate to scrape the lint film accumulated in the lint filter 130. On the other hand, when the driving motor 143*b* rotates in the reverse direction, the first coupler 151 and the second coupler 152 may be separated from each other while each sliding on an opposite one of the inclined surface 151*c* and 152*c*.

Since the first coupler 151 and the second coupler 152 have the inclined surfaces 151*c* and 152*c*, the first coupler 151 and the second coupler 152 may be separated from each other by a relatively small driving force of the driving motor 143*b*.

The first case 181*a* may include the first rotation shaft 182. The terminal gear 141 may be coupled to the first rotation shaft 182.

The first rotation shaft 182 may include a screw crest 182*a*. The terminal gear 141 may include a screw root 141*b* corresponding to the screw crest 182*a*. With such configuration, the terminal gear 141 and the first rotation shaft 182 may be effectively coupled to each other, and during rotation in direction A by the driving motor 143*b*, the terminal gear 141 may move in direction B along a portion in which the screw root 141*b* of the terminal gear 141 is coupled to the screw crest 182*a* of the first rotation shaft 182 is coupled. That is, due to the screw crest 182*a* and the screw root 141*b*, the terminal gear 141 may be easily rotated and move in direction B according to the coupling and separation of the first coupler 151 and the second coupler 152 without path deviation.

The terminal gear 141 may be elastically biased by an elastic member 153. The terminal gear 141 may be connected to the plurality of gears 142 to receive power from the motor. The terminal gear 141 may be integrally formed with the first coupler 151. That is, power transmitted from the motor to the terminal gear 141 may be transmitted to the second coupler 152 to operate the rotation member 120. The driving device 140 includes the terminal gear 141, and the coupling device 150 includes the first coupler 151, but when the terminal gear 141 and the first coupler 151 are integrally formed with each other, the terminal gear 141 and the first coupler 151 may be included in the driving device 140 and the coupling device 150 at the same time.

The elastic member 153 may be disposed between the first case 181*a* and the terminal gear 141. The elastic member 153 may include a spring. When the driving motor 143*b* rotates in the forward direction and then the first coupler 151 and the second coupler 152 are coupled to each other, the elastic member 153 may be in an uncompressed state. However, the disclosure is not limited thereto, and the elastic member 153 may be provided on the second rotation shaft 121 and disposed between the second coupler 152 and the fin 122.

When the driving motor 143*b* rotates in the reverse direction and the first coupler 151 and the second coupler 152 are separated from each other, the elastic member 153 may receive a compressive force from the terminal gear 141 exerting toward the first case 181*a*. The elastic member 153, upon receiving the compressive force, may be compressed until the first coupler 151 and the second coupler 152 slide through the inclined surface 151*c* and 152*c* to be completely separated. Accordingly, more and more force of the driving motor 143*b* may be used until the first coupler 151 and the second coupler 152 are completely separated. The use of the elastic member 153 may increase the coupling stability of the first coupler 151 and the second coupler 152. In addition, since compression occurs during separation, when first coupler 151 and the second coupler 152 are recoupled to each other, the first coupler 151 and the second coupler 152 may be recoupled with a small force due to the restoring force of the elastic member 153.

Figure 14A:
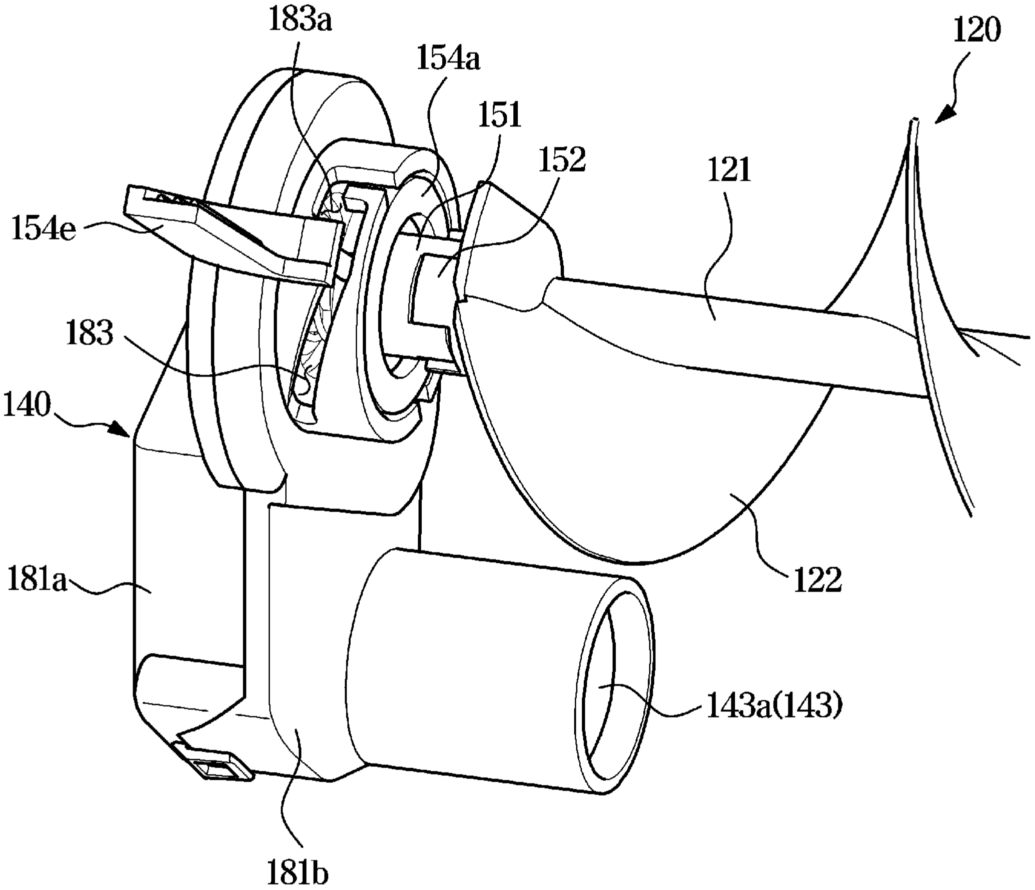
FIG. 14A is a view illustrating a coupling device coupled to a driving device in a clothes dryer according to still another embodiment of the disclosure.
Figure 14B:
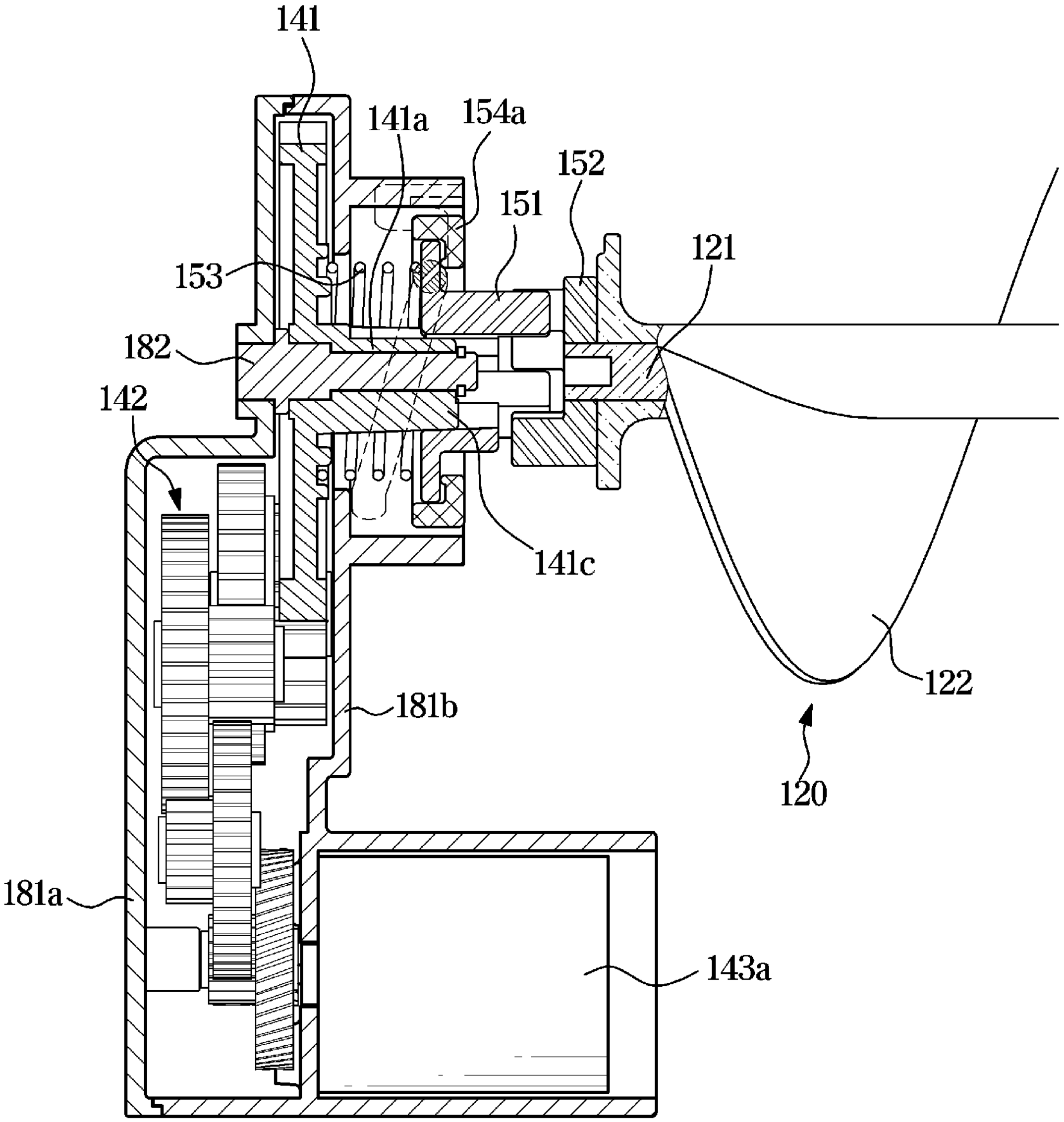
FIG. 14B is a cross-sectional view illustrating the driving device and the coupling device in the clothes dryer shown in FIG. 14A.
Figure 15A:
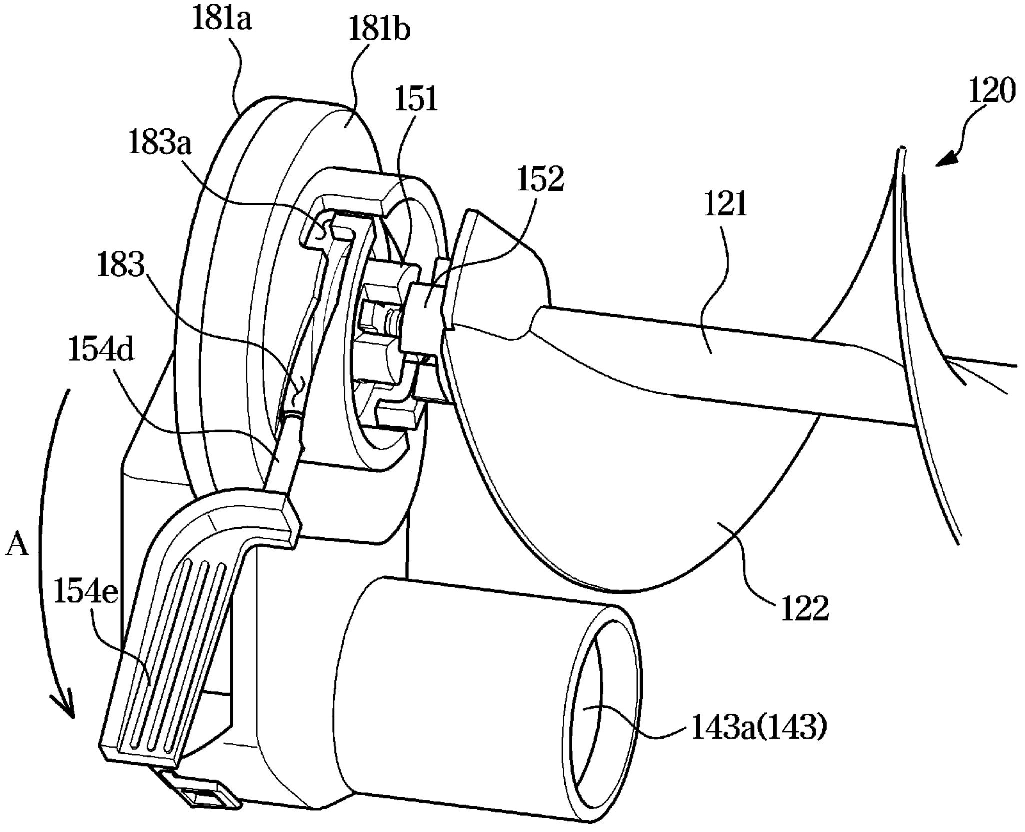
FIG. 15A is a view illustrating the coupling device separated from the driving device in the clothes dryer according to the still another embodiment of the disclosure.
Figure 15B:
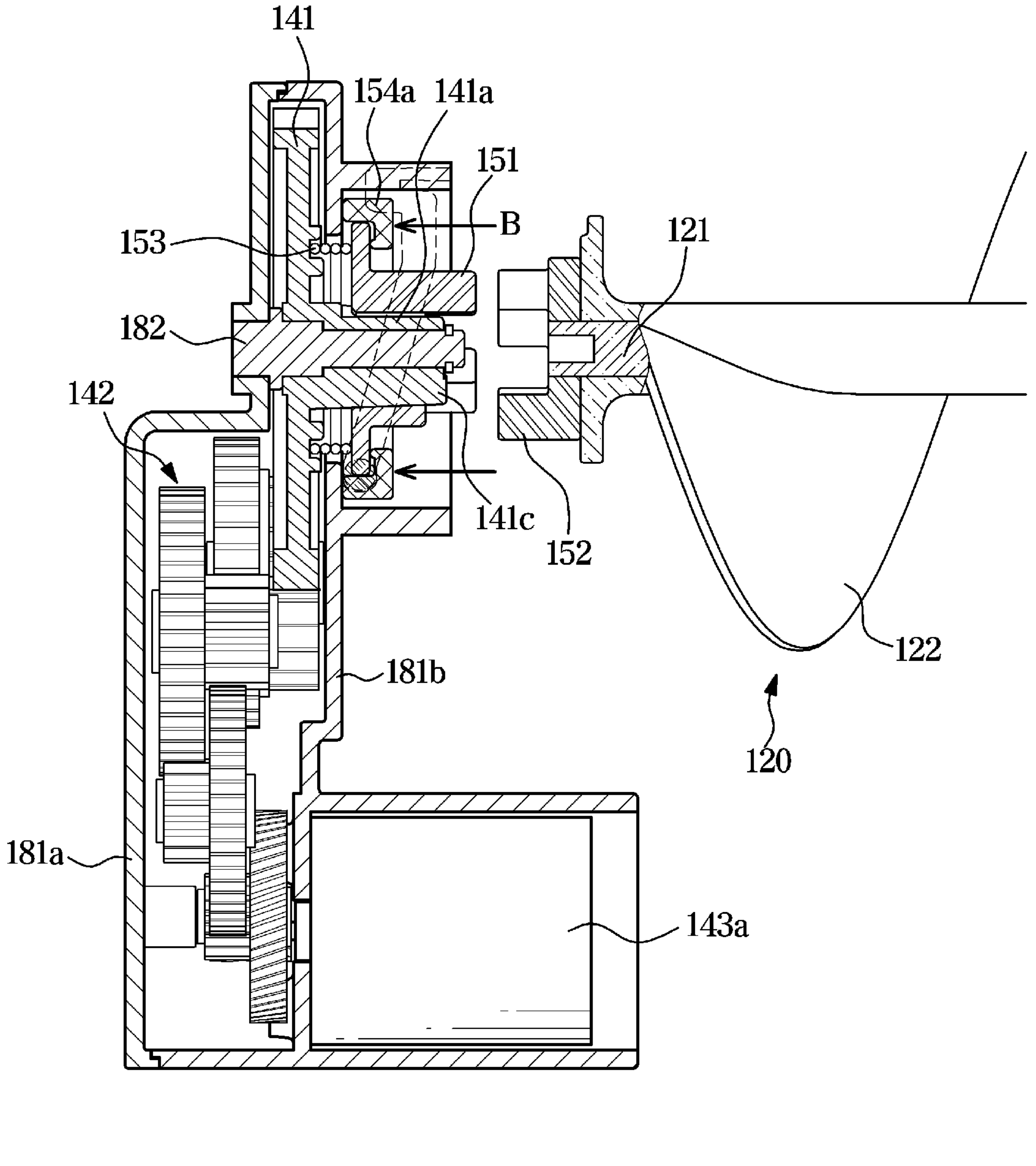
FIG. 15B is a cross-sectional view illustrating the driving device and the coupling device in the clothes dryer shown in FIG. 15A.

FIG. 14A is a view illustrating a coupling device coupled to a driving device in a clothes dryer according to still another embodiment of the disclosure. FIG. 14B is a cross-sectional view illustrating the driving device and the coupling device in the clothes dryer shown in FIG. 14A. FIG. 15A is a view illustrating the coupling device separated from the driving device in the clothes dryer according to the still another embodiment of the disclosure. FIG. 15B is a cross-sectional view illustrating the driving device and the coupling device in the clothes dryer shown in FIG. 15A.

Referring to FIGS. 14A to 15B, the clothes dryer according to the embodiment may include the holder 154. The holder 154 may include a holder body 154*a*, a holder bar 154*e*, and a holder neck 154*d*. The holder body 154*a*, the holder bar 154*e*, and the holder neck 154*d* may be integrally formed with each other. However, the disclosure is not limited thereto.

The holder bar 154*e* may serve as a handle that may be easily pressed and pushed by a user when coupling or separating the first coupler 151 to or from the second coupler 152. The holder neck 154*d* is disposed to connect the holder body 154*a* to the holder bar 154*e*. The holder body 154*a*, the holder neck 154*d*, and the holder bar 154*e* may be integrally formed with each other, but are not limited thereto and may be formed as separate components.

By pressing the holder bar 154*e* in direction A, the holder 154 may be rotated along a first guider 183 so that the holder 154 may move in direction B while rotating in direction A. In this case, the elastic member 153 may be compressed. As the holder 154 moves in direction B, the first coupler 151 and the second coupler 152 may be separated from each other.

The holder 154 may be provided to surround the first coupler 151 at an outside of the first coupler 151.

The second case 181*b* may include the first guider 183 configured to allow the rotational motion (motion in direction A) of the holder 154 to be converted into a linear motion of the holder 154 (motion in direction B), and formed in an inclined shape to prevent the holder 154 from being separated.

Due to the functions of the holder 154 and the first guider 183 described above, the first coupler 151 and the second coupler 152 may be easily coupled to and separated from each other.

The first guider 183 may be provided at an upper portion thereof with a guider groove 183*a*. When the first coupler 151 and the second coupler 152 are coupled to each other, the holder 154 may be separated through the guider groove 183*a*.

The driving device 140 may include a terminal gear 141. The terminal gear 141 may transmit power to the coupling device 150. The terminal gear 141 according to the embodiment may not move, irrespective of the coupling and separation. The terminal gear 141 may be connected to the plurality of gears 142 to receive power from the motor 143*a*. The terminal gear 141 may have a protrusion 141*a* extending in the axial direction. The protrusion 141*a* may be formed in a shape corresponding to that of the first coupler 151 so as to be coupled to the first coupler 151. That is, the protrusion 141*a* may include a plurality of flanges 141*b* radially protruding from the protrusion 141*a*. The flange 141*c* may extend along the longitudinal direction of the protrusion 141*a*. In the drawing, the number of flanges 141*c* is not limited as shown in the drawings. Power transmitted from the motor 143*a* may be connected to the first coupler 151 and the second coupler 152 to operate the rotation member 120.

Although not shown, the first coupler 151 and the second coupler 152 may each include coupling surfaces and inclined surfaces.

The terminal gear 141 may be integrally formed with the first coupler 151.

The elastic member 153 may be disposed between the first case 181*a* and the terminal gear 141. The elastic member 153 may include a spring. As the first coupler 151 and the terminal gear 141 move in direction B, the elastic member 153 may be compressed.

The use of the elastic member 153 may increase the coupling stability of the first coupler 151 and the second coupler 152. In addition, since compression occurs during separation, when the first coupler 151 and the second coupler 152 are recoupled to each other, the first coupler 151 and the second coupler 152 may be recoupled with a small force due to the restoring force of the elastic member 153.

Figure 16A:
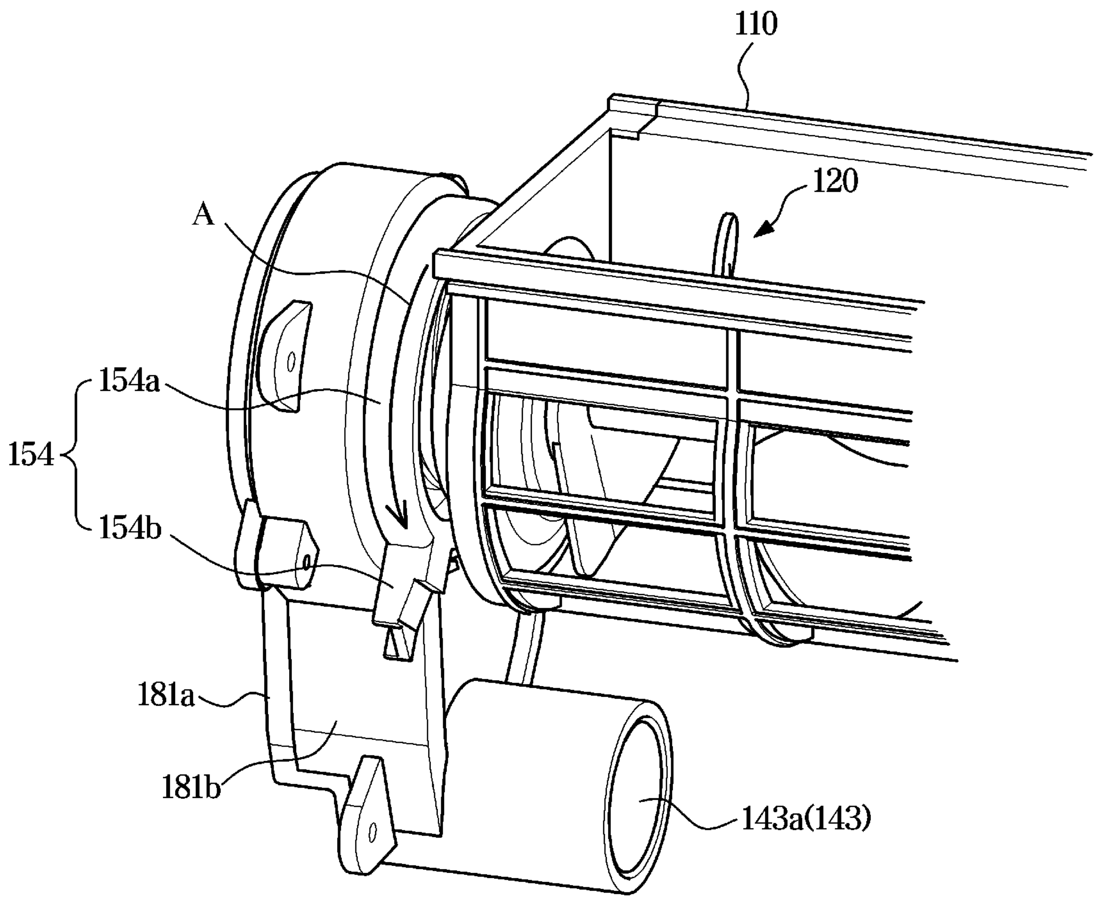
FIG. 16A is a view illustrating a coupling device coupled to a driving device in a clothes dryer according to still another embodiment of the disclosure.
Figure 16B:
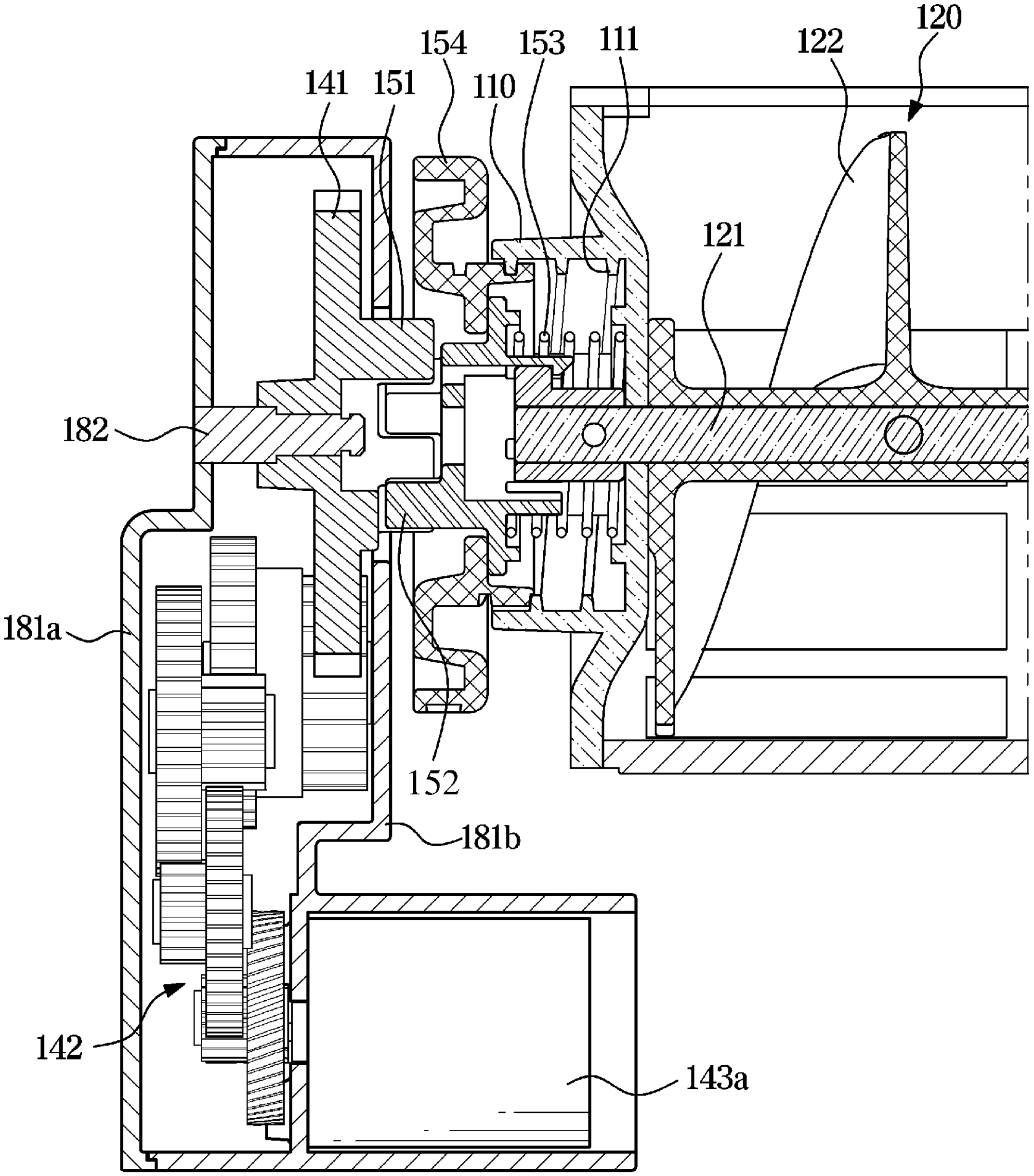
FIG. 16B is a cross-sectional view illustrating the driving device and the coupling device coupled to each other in the clothes dryer shown in FIG. 16A.
Figure 16C:
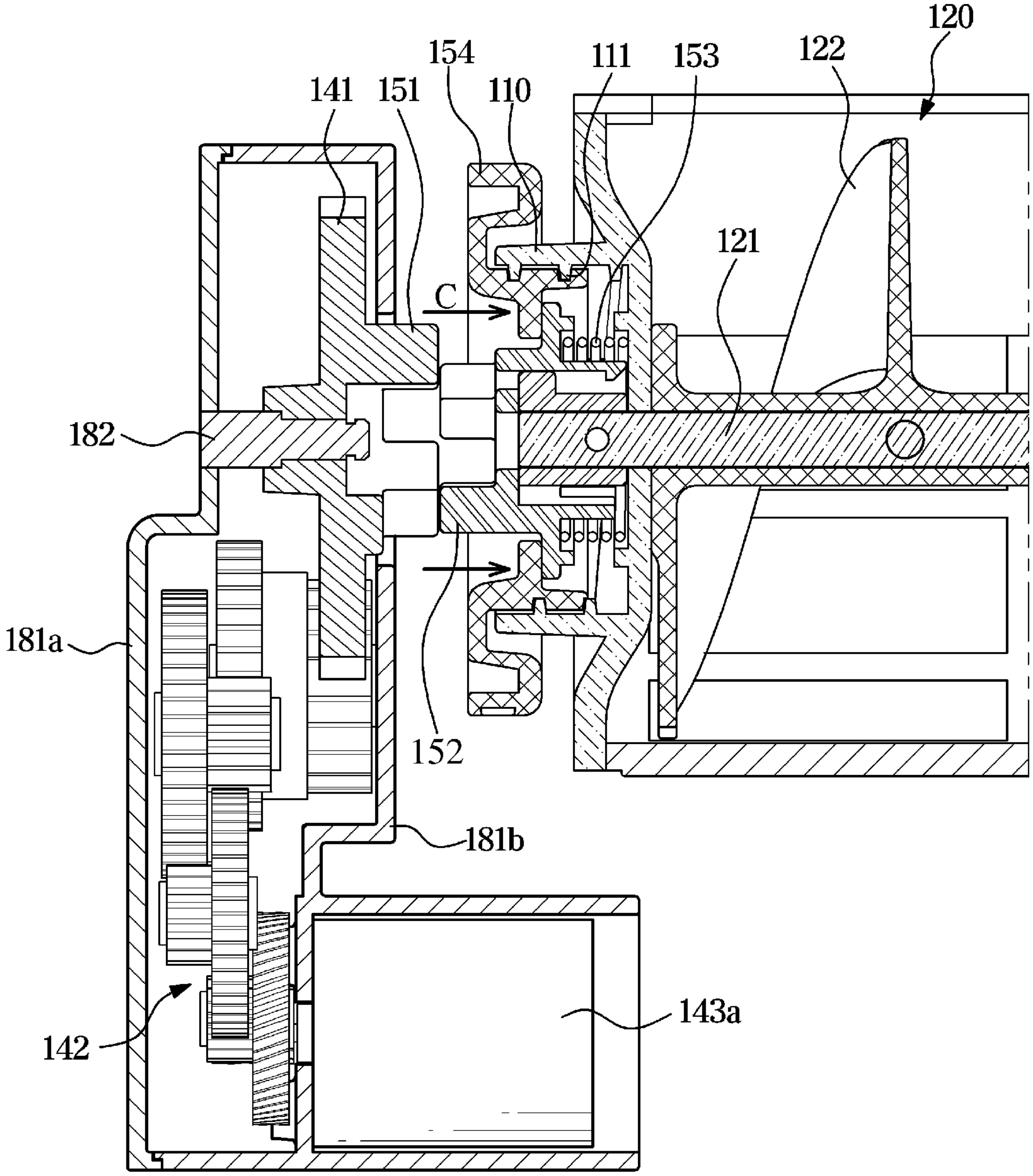
FIG. 16C is a cross-sectional view illustrating the driving device and the coupling device separated from each other in the clothes dryer shown in FIG. 16A.

FIG. 16A is a view illustrating a coupling device coupled to a driving device in a clothes dryer according to still another embodiment of the disclosure. FIG. 16B is a cross-sectional view illustrating the driving device and the coupling device coupled to each other in the clothes dryer shown in FIG. 16A. FIG. 16C is a cross-sectional view illustrating the driving device and the coupling device separated from each other in the clothes dryer shown in FIG. 16A.

Referring to FIGS. 16A to 16C, the frame member 110 may include a second guider 111 having a screw crest shape.

The holder 154 may be coupled to the frame member 110. The second guider 111 may guide the rotation direction when the holder 154 is coupled to the filter frame 132.

When a user rotates the holder arm 154*b* in direction A, the holder 154 may move in direction C along the second guider 111 formed on the filter frame 132. In this case, the elastic member 153 may be compressed. As the holder 154 moves in direction C, the first coupler 151 and the second coupler 152 may be separated from each other. That is, the A-direction rotational motion is converted into the C-direction linear motion to separate the first coupler 151 from the second coupler 152.

The holder 154 may provide a user with convenience of use when coupling or separating the first coupler 151 to or from the second coupler 152, and due to the second guider 111 formed on the frame member 110, the holder 154 may be stably coupled or separated without path deviation.

The terminal gear 141 may be connected to the plurality of gears 142 to receive power from the motor 143*a*. The terminal gear 141 may be integrally formed with the first coupler 151. That is, the power transmitted from the motor 143*a* to the terminal gear 141 may be transmitted to the second coupler 152 to operate the rotation member 120.

The holder 154 may include the holder body 154*a* and the holder arm 154*b*. The holder body 154*a* may be formed in a circular shape. The holder arm 154*b* may be formed to radially protrude from the holder body 154*a*. The holder body 154*a* and the holder arm 154*b* may be integrally formed with each other. However, the disclosure is not limited thereto.

The elastic member 153 may be disposed between the second coupler 152 and the rotation member 120. The elastic member 153 may include a spring.

The use of the elastic member 153 may increase the coupling stability of the first coupler 151 and the second coupler 152. In addition, since compression occurs during separation, when the first coupler 151 and the second coupler 152 are recoupled to each other, the first coupler 151 and the second coupler 152 may be recoupled with a small force due to the restoring force of the elastic member 153.

In a state in which the first coupler 151 and the second coupler 152 are coupled, the elastic member 153 may be in an uncompressed state. On the other hand, when the holder 154 rotates to separate the first coupler 151 from the second coupler 152, the elastic member 153 may be compressed. In this case, the elastic member 153 may receive a compressive force exerting toward the rotation member 120. The elastic member 153 upon receiving the compression force may be compressed until the first coupler 151 and the second coupler 152 are completely separated from each other. Therefore, more and more force may be used until the first coupler 151 and the second coupler 152 are separated from each other.

The use of the elastic member 153 may increase the coupling stability of the first coupler 151 and the second coupler 152. In addition, since compression occurs during separation, when the first coupler 151 and the second coupler 152 are recoupled to each other, the first coupler 151 and the second coupler 152 may be recoupled with a small force due to the restoring force of the elastic member 153.

Figure 17A:
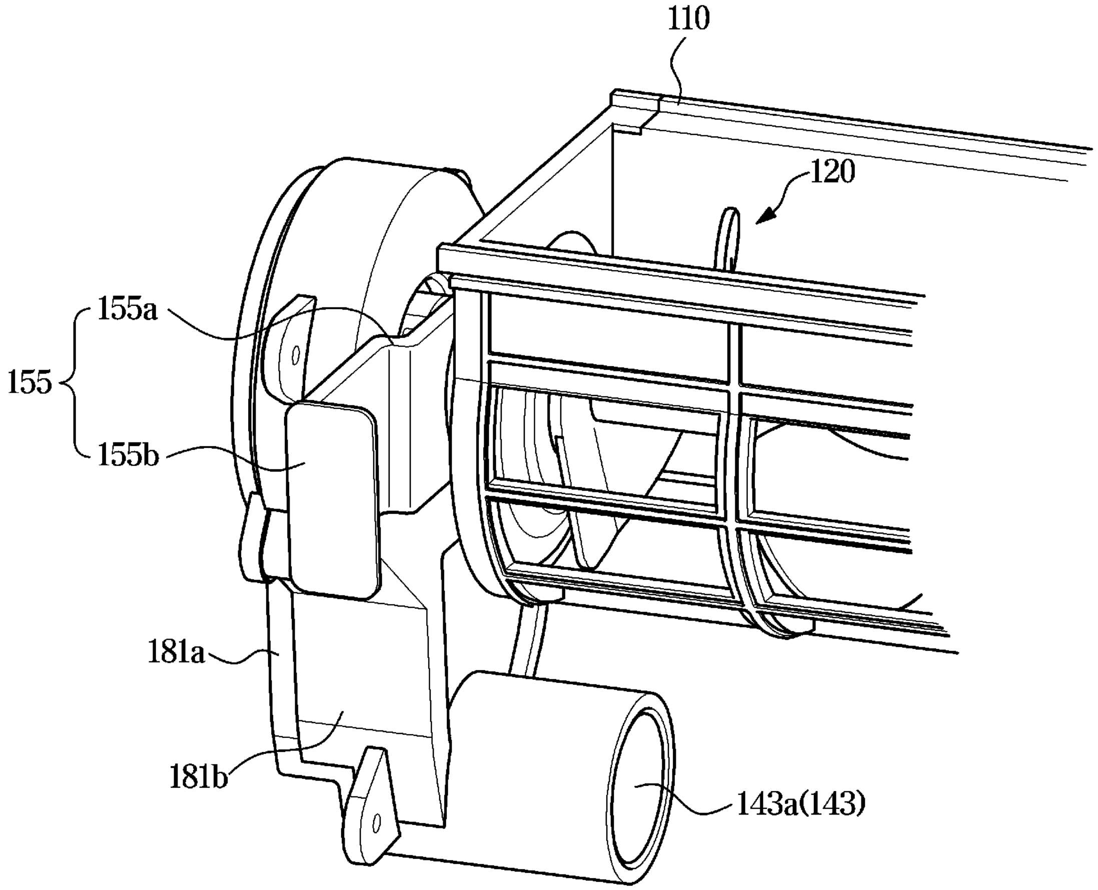
FIG. 17A is a view illustrating a coupling device coupled to a driving device in a clothes dryer according to still another embodiment of the disclosure.
Figure 17B:
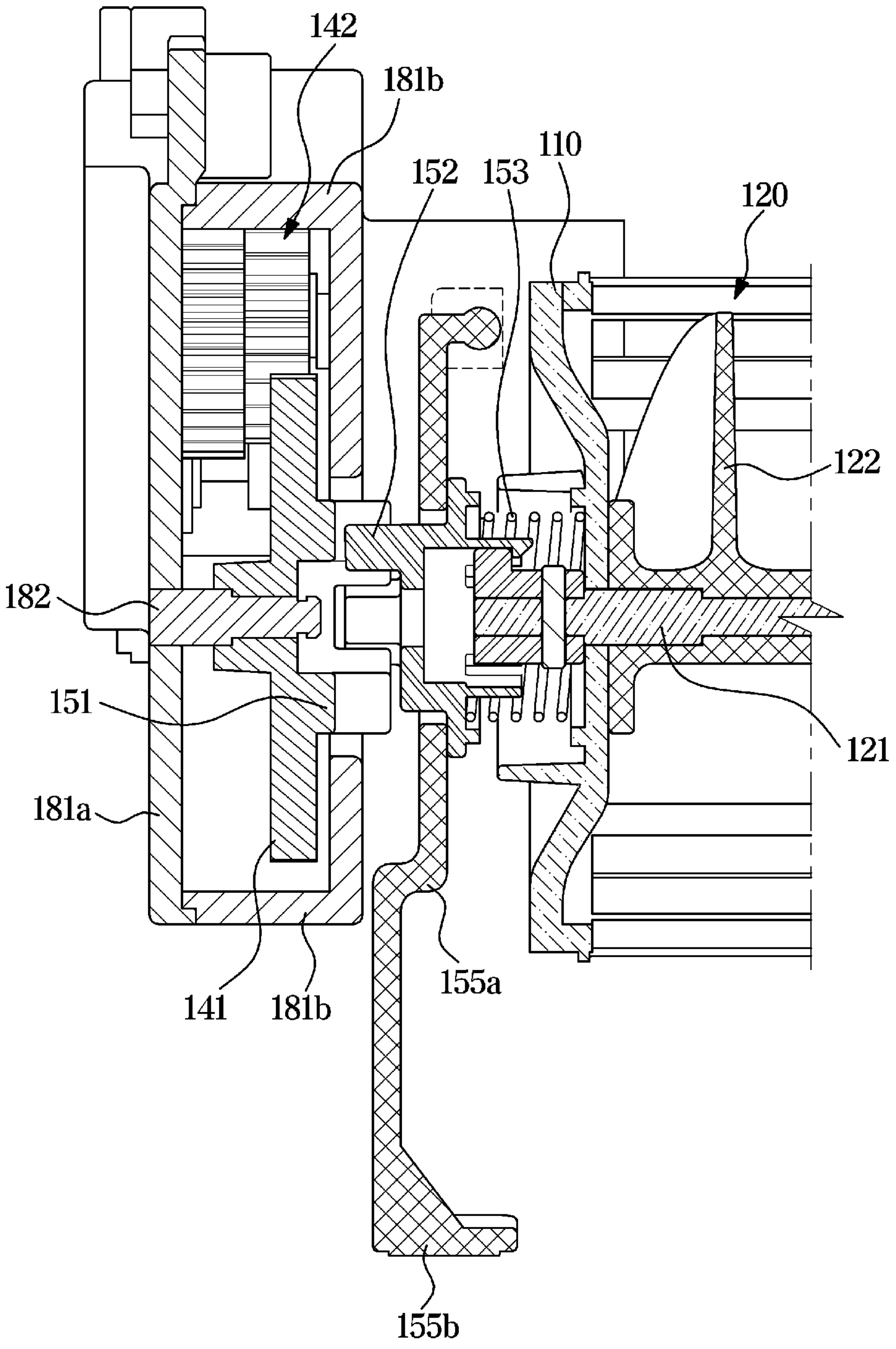
FIG. 17B is a cross-sectional view illustrating the driving device and the coupling device coupled to each other in the clothes dryer shown in FIG. 17A.
Figure 17C:
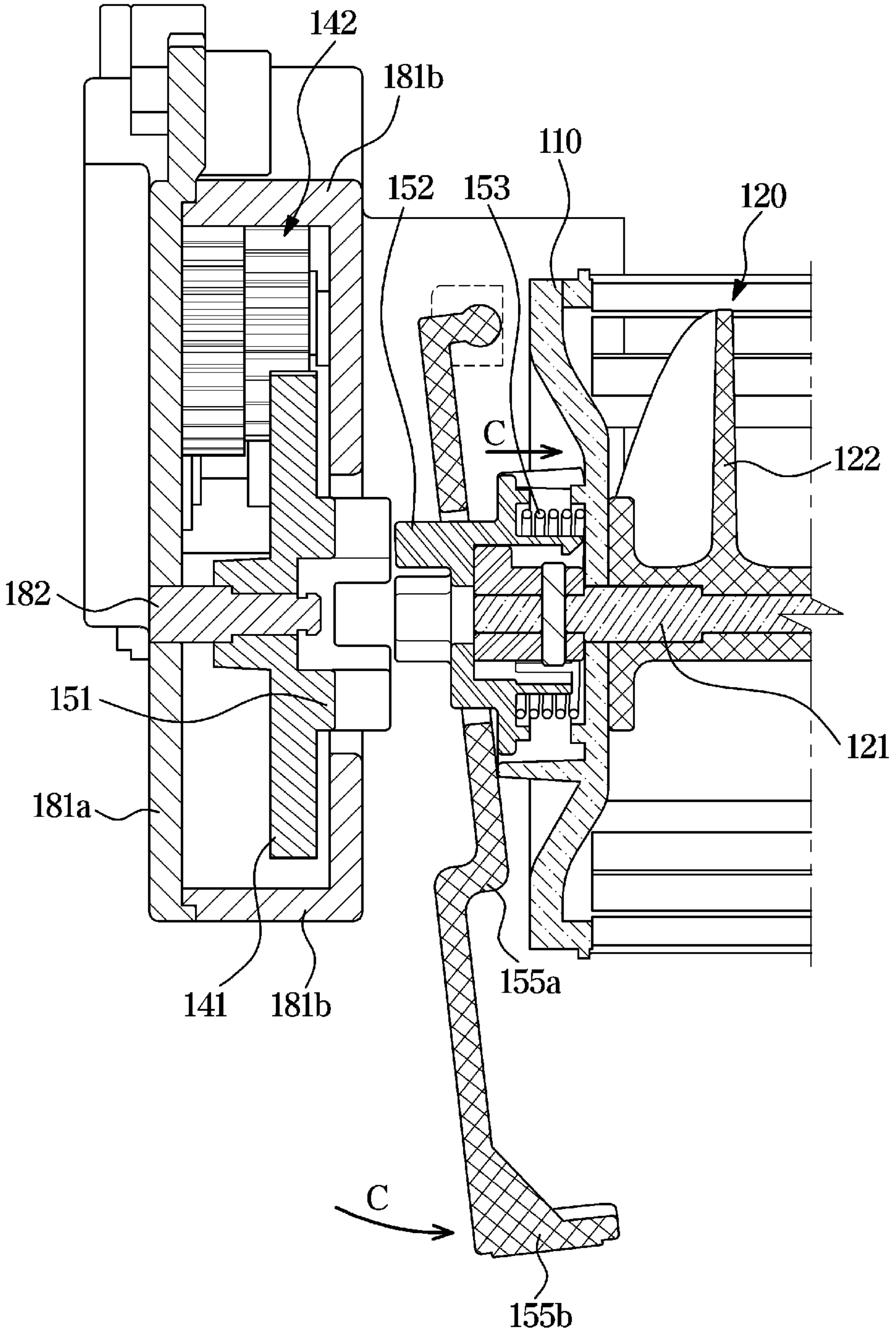
FIG. 17C is a cross-sectional view illustrating the driving device and the coupling device separated from each other in the clothes dryer shown in FIG. 17A.

FIG. 17A is a view illustrating a coupling device coupled to a driving device in a clothes dryer according to still another embodiment of the disclosure. FIG. 17B is a cross-sectional view illustrating the driving device and the coupling device coupled to each other in the clothes dryer shown in FIG. 17A. FIG. 17C is a cross-sectional view illustrating the driving device and the coupling device separated from each other in the clothes dryer shown in FIG. 17A.

Referring to FIGS. 17A to 17C, the coupling device 150 may include a lever 155. The lever 155 may be coupled to an outside of the second coupler 152.

The lever 155 may include a lever body 155*a* and a push bar 155*b*. A length from the lever body 155*a* to the push bar 155*b* is longer than a length from the push bar 155*b* to the lever body 155*a*. One end of the push bar 155*b* may be formed and bent. The lever body 155*a* and the push bar 155*b* are illustrated in a quadrangular shape, but are not limited thereto and may include various shapes. The lever body 155*a* and the push bar 155*b* may be integrally formed with each other. However, the disclosure is not limited thereto.

When a user presses the push bar 155*b* in direction C, the first coupler 151 and the second coupler 152 may be separated from each other. In this case, the elastic member 153 may be compressed.

The user may easily separate the first coupler 151 from the second coupler 152 using the lever 155.

In the drawing, the lever 155 is illustrated as being coupled to the outside of the second coupler 152, but is not limited thereto, and may be coupled to the outside of the first coupler 151. When the lever 155 is coupled to the outside of the first coupler 151, the user may easily separate the first coupler 151 from the second coupler 152 by pressing the push bar 155*b* in a direction opposite to direction C.

The terminal gear 141 may be connected to the plurality of gears 142 to receive power from the motor 143*a*. The terminal gear 141 may be integrally formed with the first coupler 151. That is, the power transmitted from the motor 143*a* to the terminal gear 141 may be transmitted to the second coupler 152 to operate the rotation member 120.

The elastic member 153 may be disposed between the second coupler 152 and the rotation member 120. The elastic member 153 may include a spring.

In a state in which the first coupler 151 and the second coupler 152 are coupled to each other, the elastic member 153 may be in an uncompressed state. On the other hand, when a user presses the lever 155 to separate the first coupler 151 from the second coupler 152, the elastic member 153 may be compressed. In this case, the elastic member 153 may receive a compressive force exerting toward the rotation member 120. The elastic member 153 upon receiving the compression force may be compressed until the first coupler 151 and the second coupler 152 are completely separated from each other.

The use of the elastic member 153 may increase the coupling stability of the first coupler 151 and the second coupler 152. In addition, since compression occurs during separation, when the first coupler 151 and the second coupler 152 are recoupled to each other, the first coupler 151 and the second coupler 152 may be recoupled with a small force due to the restoring force of the elastic member 153.

The lever 155 is pressed toward the second coupler 152 so that the first coupler 151 and the second coupler 152 may be separated from each other. The lever 155 may be disposed to rotate in a counterclockwise direction when viewed from the front by being pressed.

As is apparent from the above, the clothes dryer according to the aspect of the disclosure is provided with a lint removal apparatus that is easily separated using a coupler structure.

The clothes dryer according to an aspect of the disclosure is provided with a holder and a link member to separate a lint removal apparatus with simple operation.

The clothes dryer according to an aspect of the disclosure ensures a long time use with a coupling device of a driving device and a lint removing device using a coupler structure.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A clothes dryer comprising:
- a cabinet;
- a drum rotatably supported in the cabinet;
- a supply port configured to guide air into the drum;
- an exhaust port configured to guide the air in the drum to an outside of the drum; and
- a lint removing apparatus configured to remove lint from the air passing through the exhaust port,
- wherein the lint removing apparatus includes:
  - a lint filter configured to capture lint,
  - a screw conveyor rotatably installed to scrape and collect the lint captured in the lint filter,
  - a driving device including a motor, and configured to generate power,
  - a first coupler connected to the driving device to receive the power from the driving device,
  - a second coupler coupled to the first coupler to transmit the power to the screw conveyor,
  - a holder in contact with the second coupler, and configured to move the second coupler so that the first coupler and the second coupler are coupled to or separated from each other, and
  - an elastic member configured to elastically press the holder so that the first coupler and the second coupler are in a disengaged state to an engaged state.

2. The clothes dryer of claim 1, wherein:
- the lint removal apparatus further includes a first rotation shaft to which the first coupler is coupled and a second rotation shaft to which the second coupler is coupled, and
- the elastic member is disposed between the holder and the screw conveyor, and configured to elastically press the holder.

3. The clothes dryer of claim 1, wherein the lint removing apparatus further includes a frame member configured to surround the screw conveyor, and
- wherein the holder is rotatably coupled to the frame member.

4. The clothes dryer of claim 1, wherein the elastic member is disposed between a frame member and the second coupler so that the elastic member presses the second coupler and the holder in the disengaged state to the engaged state.

5. The clothes dryer of claim 1, wherein the motor is rotatable in both directions.

* * * * *